(12) United States Patent
Takaoka et al.

(10) Patent No.: US 8,571,795 B2
(45) Date of Patent: Oct. 29, 2013

(54) NAVIGATION APPARATUS AND NAVIGATION INFORMATION CALCULATION METHOD

(75) Inventors: Tomohisa Takaoka, Kanagawa (JP); Masashi Ohkubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1563 days.

(21) Appl. No.: 11/846,748

(22) Filed: Aug. 29, 2007

(65) Prior Publication Data

US 2008/0109166 A1 May 8, 2008

(30) Foreign Application Priority Data

Aug. 31, 2006 (JP) ................................. 2006-236485

(51) Int. Cl.
*G01C 21/00* (2006.01)
(52) U.S. Cl.
USPC ........... 701/504; 701/500; 701/501; 701/502; 701/505
(58) Field of Classification Search
USPC ......... 701/200, 207, 210, 213, 214, 216, 217, 701/220; 340/466, 467; 73/1.78–1.79; 244/2, 75.1, 174–197
See application file for complete search history.

(56) References Cited

U.S. PATENT DOCUMENTS 6,029,111 A 2/2000 Croyle

FOREIGN PATENT DOCUMENTS

| JP | 2000-055678 | 2/2000 |
|---|---|---|
| JP | 2000-502802 | 3/2000 |
| JP | 2004-138553 | 5/2004 |
| JP | 2004-239613 | 8/2004 |
| JP | 2005-147696 | 6/2005 |
| WO | WO 02/88731 | 3/2002 |

OTHER PUBLICATIONS

European Search Report for Application No. 07114609.6—1236/ 1895271, dated Feb. 17, 2012 from the European Patent Office, Netherlands.

*Primary Examiner* — Bhavesh V Amin
(74) *Attorney, Agent, or Firm* — Finnegan, Henderson, Farabow, Garrett & Dunner, L.L.P.

(57) ABSTRACT

A navigation apparatus includes: a section that calculates a mobile object's acceleration in the direction of the motion, based on the mobile object's speed calculated from information received from a satellite; a section that calculates lateral acceleration whose direction is perpendicular to the mobile object's motion, based on the mobile object's speed and direction calculated from information received from the satellite; an acceleration sensor that observes motion acceleration of the mobile object and gravity acceleration; a section that calculates an altitude difference of road based on an atmospheric pressure value supplied from a barometric sensor; a section that calculates an inclination angle of the road in the direction of the motion, based on the altitude difference and a travel distance corresponding to the mobile object's speed; and a section that calculates an attachment angle of the acceleration sensor with respect to the mobile object by using a multidimensional function formula.

13 Claims, 8 Drawing Sheets

NAVIGATION APPARATUS AND NAVIGATION INFORMATION CALCULATION METHOD

CROSS REFERENCES TO RELATED APPLICATIONS

The present invention contains subject matter related to Japanese Patent Application JP2006-236485 filed in the Japanese Patent Office on Aug. 31, 2006, the entire contents of which being incorporated herein by reference.

BACKGROUND OF THE INVENTION

1. Field of the Invention

The present invention relates to a navigation apparatus and navigation information calculation method, and is preferably applied to a car navigation apparatus mounted on a vehicle, for example.

2. Description of Related Art

Generally, a car navigation apparatus receives from a Global Positioning System (GPS) satellite a GPS signal and then calculates the position of a vehicle, which is then displayed. In addition, as disclosed in Patent Document 1 (see Jpn. Pat. Laid-open Publication No. 2004-138553), while not receiving the GPS signal due to the vehicle running inside a tunnel or the like, the car navigation system calculates, by using an acceleration sensor, the vehicle's acceleration in the direction of movement and then estimates the speed of the vehicle based on the calculated acceleration. The car navigation system can therefore display the current position of the vehicle, estimated based on the vehicle's speed, even when the vehicle does not receive the GPS signal.

SUMMARY OF THE INVENTION

In that manner, the car navigation apparatus usually uses the acceleration sensor to calculate the vehicle's acceleration in the direction of movement. However, this is possible only when an acceleration detection axis of the acceleration sensor is aligned with the direction of the vehicle's motion.

On the other hand, there is a portable car navigation apparatus that can be freely mounted and removed from the vehicle. In this case, when a user attaches the car navigation apparatus to the vehicle, the attachment angle, an angle of the car navigation apparatus's body (in which the acceleration sensor is installed) with respect to the vehicle, may differ from that of the car navigation apparatus attached by others. Accordingly, the acceleration detection axis of the acceleration sensor may not be aligned with the direction of the vehicle's motion. In this manner, the set-up condition of the car navigation apparatus may not be satisfied.

If the acceleration detection axis of the acceleration sensor is not aligned with the direction of the vehicle's motion, the acceleration sensor may also detect acceleration in other directions, such as the gravity acceleration g or the lateral acceleration G caused by changing directions. In addition, this may change gains in the direction of the vehicle's motion. Accordingly, that may decrease the precision of calculating the acceleration in the direction of the motion.

The present invention has been made in view of the above points and is intended to provide a navigation apparatus and navigation information calculation method that can calculate, even when signals are not received from a satellite, the current position and speed of a mobile object by calculating an attachment angle of an acceleration sensor with respect to the mobile object.

In one aspect of the present invention, a navigation apparatus includes: travel direction acceleration calculation means for calculating a mobile object's acceleration in the direction of the mobile object's motion, based on the mobile object's speed calculated from information received from a satellite; lateral acceleration calculation means for calculating lateral acceleration whose direction is perpendicular to the mobile object's motion, based on the mobile object's speed and direction calculated from information received from the satellite; acceleration sensor for observing motion acceleration of the mobile object and gravity acceleration; altitude difference calculation means for calculating an altitude difference of road based on an atmospheric pressure value supplied from a barometric sensor; inclination calculation means for calculating an inclination angle of the road in the direction of the motion, based on the altitude difference and a travel distance corresponding to the mobile object's speed; and attachment angle calculation means for calculating an attachment angle of the acceleration sensor with respect to the mobile object by using a multidimensional function formula including the acceleration in the direction of the motion, the lateral acceleration, values observed by the acceleration sensor and the inclination angle, the observed values including the motion acceleration and the gravity acceleration.

Accordingly, the navigation apparatus can precisely calculate the angle of the acceleration sensor with respect to the mobile object even if the acceleration sensor is attached to the mobile object in unexpected manners.

In that manner, the navigation apparatus can precisely calculate the angle of the acceleration sensor with respect to the mobile object even if the acceleration sensor is attached to the mobile object in unexpected manners. Thus, the navigation apparatus and method thereof can calculate, even when signals are not received from the satellite, the current position and speed of the mobile object.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) Basic Principle when a portable car navigation apparatus is mounted on a vehicle (equivalent to a mobile object), an acceleration detection axis of its acceleration sensor, incorporated in its body section along with a monitor, may not be aligned with the direction of the vehicle's motion. In this case, the acceleration sensor may also detect acceleration in other directions, such as the gravity acceleration g or the lateral acceleration G cause by changing directions. In addition, this may change gains in the direction of the vehicle's motion. Accordingly, that may decrease the precision of calculating the acceleration in the direction of the motion.

Accordingly, a car navigation apparatus according to an embodiment of the present invention is designed to precisely calculate the acceleration in the direction of the vehicle's motion even if an acceleration detection axis of its acceleration sensor, incorporated in its body section along with a monitor, is not aligned with the direction of the motion. Therefore, even when not receiving GPS signals, the car navigation apparatus estimates the acceleration in the direction of the vehicle's motion based on the detection result of the acceleration sensor, calculates the vehicle's speed based on the estimated acceleration, and then precisely estimates the current position of the vehicle based on the calculated speed. As a result, the car navigation apparatus can display the current position of the vehicle. The method will be described below.

(1-1) Correlation between Two Coordinate Axes

Figure 1:
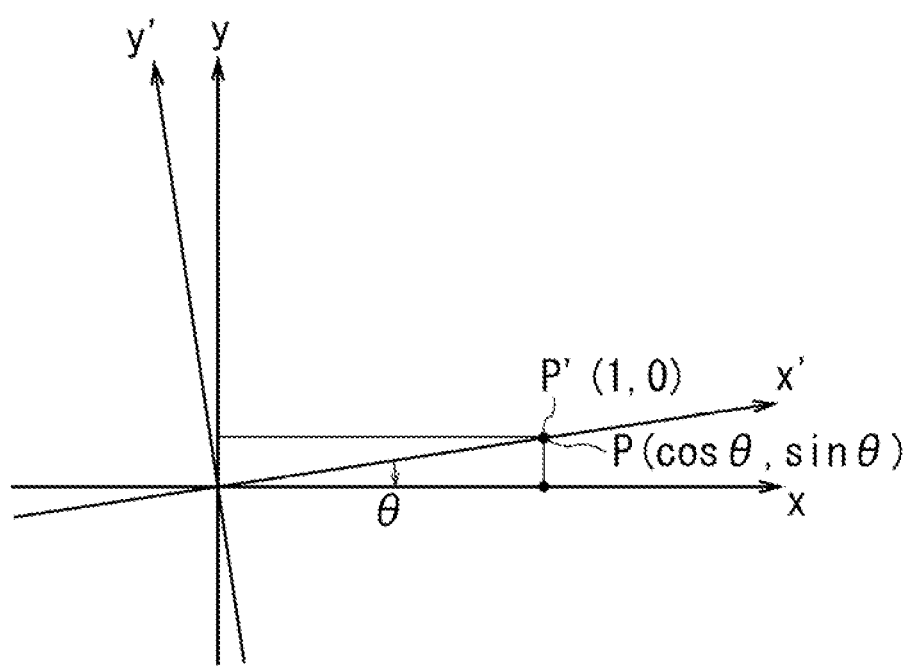
FIG. 1 is a schematic perspective view illustrating the correlation between two coordinate axes.

As shown in FIG. 1, to transform a x-y coordinate system into x'-y' coordinate system, a transformation matrix T becomes:

$$T = \begin{pmatrix} \cos\theta & -\sin\theta \\ \sin\theta & \cos\theta \end{pmatrix} \quad (1)$$

If a position p $(\cos\theta, \sin\theta)$ in the x-y coordinate system is equivalent to a position p' $(1, 0)$ in the x'-y' coordinate system, the following equation represents the correlation between the two coordinate systems:

p=Tp'

$$p'=T^{-1} \cdot p \quad (2)$$

(1-2) Definition of Terms for Angles

There are three kinds of angles when a monitor-integrated-type body section (a body section in which a monitor is incorporated) of the car navigation apparatus is mounted on a center console inside the vehicle.

Figure 2:
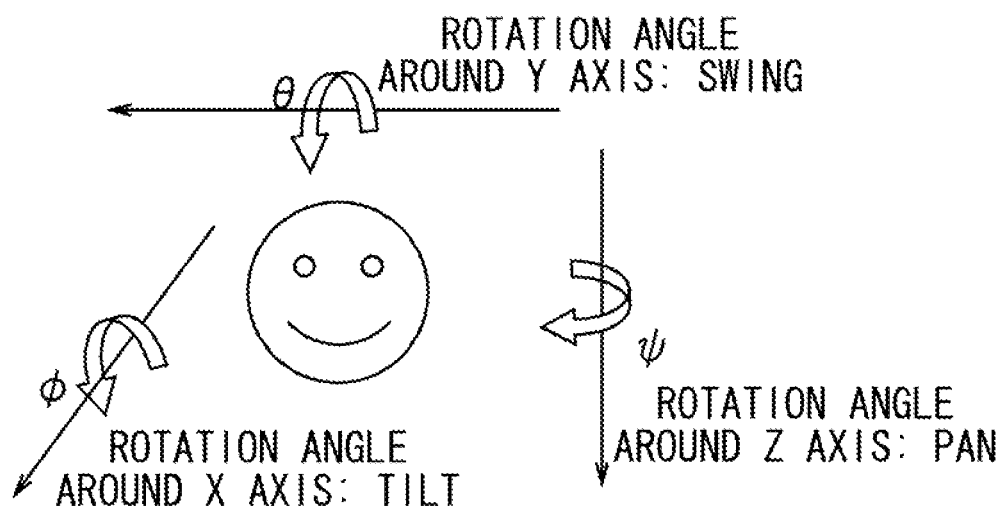
FIG. 2 is a schematic diagram illustrating definition of angles.

As shown in FIG. 2, when the front, rear, left, right, upper and lower of an object can be defined, an x axis represents the front-rear direction while a y axis represents the right-left direction. In addition, a z axis represents the up-down direction. A rotation angle $\phi$ around the x axis is referred to as a "tilt angle $\phi$" while a rotation angle $\theta$ around the y axis is referred to as a "swing angle$\theta$". In addition, a rotation angle $\psi$ around the z axis is referred to as a "pan angle $\psi$".

(1-3) Correlation between Ground Surface and Vehicle When Road is Inclined

The following describes the correlation between the ground surface and the vehicle when a road is inclined. By the way, if the road (or the ground surface) is not inclined, the x axis represents the direction of the vehicle's motion, the y axis represents the lateral (horizontal) direction perpendicular to the direction of the vehicle's motion, and the z axis represents the vertical direction or the direction of the gravity acceleration.

Figure 3:
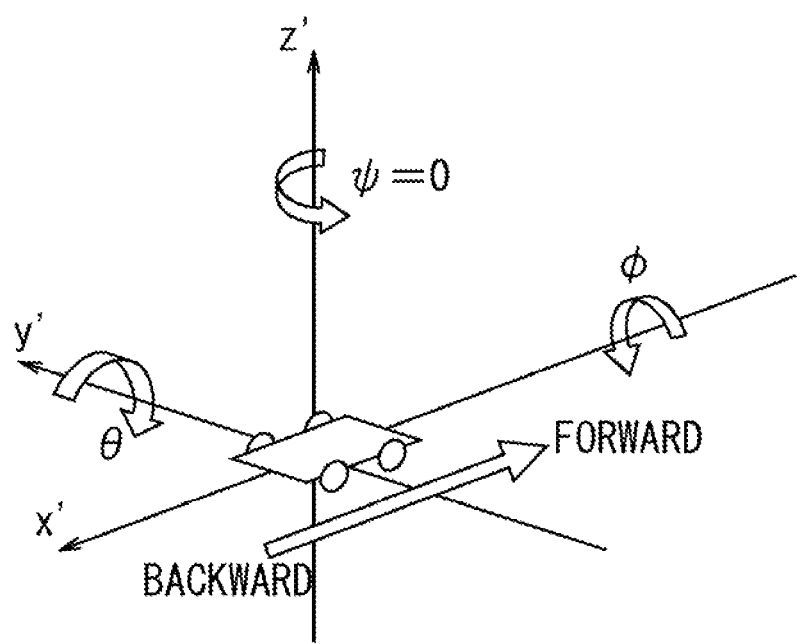
FIG. 3 is a schematic diagram illustrating a vehicle coordinate system for a vehicle on an a road, part of which is inclined.

(1-3-1) Ground Coordinate System for Ground Surface and Vehicle Coordinate System for Inclined Road FIG. 3 illustrates a vehicle coordinate system of a vehicle on an inclined road: a x' axis represents the direction of the motion of the vehicle on the inclined road, a y' axis represents the lateral direction perpendicular to the direction of the vehicle's motion and a z' axis represents the direction along the height of the vehicle.

In this vehicle coordinate system with x', y' and z' axis in which the vehicle is on the inclined road, when the vehicle moves along a bold arrow on the x' axis, the sign of the acceleration component in the direction of backward represents plus. When the vehicle turns right, the sign of the acceleration component in the direction of left represents plus. In addition, the upper direction of the vehicle represents the plus of the gravity acceleration. In this embodiment, the plus and minus directions are defined as the above. However, they may vary according to the conditions.

Employing the Euler angles between the ground coordinate system for ground surface (with x, y and z axes) and the vehicle coordinate system (with x', y' and z' axes) for the vehicle on the inclined road, the forward and backward inclination of the vehicle, when the vehicle is moving on the ascending and descending slopes or the slopes inclined in the direction of the motion, can be represented by the swing angle $\theta$ around the y' axis. In addition, the lateral inclinations of the vehicle, when the vehicle is moving on the descending slopes inclined in the right or left direction or in the lateral (horizontal) direction perpendicular to the direction of the motion, can be represented by the tilt angle $\phi$ around the x' axis. In this case, the pan angle $\psi$ around the z' axis does not represent any inclinations of the vehicle.

The swing angle $\theta$, representing the forward and backward inclination of the vehicle moving on the ascending slope, is defined as follows:

$$\theta < 0 \quad (3)$$

The tilt angle $\phi$, representing the lateral inclination of the vehicle moving on the descending slope inclined in the right direction, is defined as follows:

$$\phi < 0 \quad (4)$$

(1-3-2) Coordinate Transformation Equation for Ground Surface and Vehicle

As for the ground coordinate system (with x, y and z axes) for the ground surface and the vehicle coordinate system (with x', y' and z' axes) for the vehicle on the inclined road, a transformation matrix A is defined as follows:

$$A = \begin{pmatrix} \cos\theta & 0 & -\sin\theta \\ 0 & 1 & 0 \\ \sin\theta & 0 & \cos\theta \end{pmatrix} \begin{pmatrix} 1 & 0 & 0 \\ 0 & \cos\phi & \sin\phi \\ 0 & -\sin\phi & \cos\phi \end{pmatrix} \quad (5)$$

wherein, out of the elements of the transformation matrix A, $$\begin{pmatrix} \cos\theta & 0 & -\sin\theta \\ 0 & 1 & 0 \\ \sin\theta & 0 & \cos\theta \end{pmatrix}$$

represents the swing angle $\theta$ around the y' axis or the forward and backward inclination of the ascending or descending slope in the direction of the motion, and $$\begin{pmatrix} 1 & 0 & 0 \\ 0 & \cos\phi & \sin\phi \\ 0 & -\sin\phi & \cos\phi \end{pmatrix}$$

represents the tilt angle φ around the x' axis or the lateral inclination of the descending slope being inclined in the right or left direction, the lateral (horizontal) direction being perpendicular to the direction of the motion.

In this case, the first element of the transformation matrix A represents the forward and backward inclination while the second element represents the lateral inclination. That is, the first element for the forward and backward inclination is multiplied by the second element for the lateral inclination as if the second element follows the first element.

Accordingly, the ground coordinate system (with x, y and z axes) becomes:

$$\begin{pmatrix} x \\ y \\ z \end{pmatrix} = A \cdot \begin{pmatrix} x' \\ y' \\ z' \end{pmatrix} \qquad (6)$$

Accordingly, in the vehicle coordinate system (with x', y' and z' axes) for the vehicle on the inclined road, the gravity acceleration g becomes:

$$\begin{pmatrix} gx' \\ gy' \\ gz' \end{pmatrix} = A^{-1} \cdot \begin{pmatrix} 0 \\ 0 \\ -g \end{pmatrix} \qquad (7)$$

$$= \begin{pmatrix} 1 & 0 & 0 \\ 0 & \cos\phi & \sin\phi \\ 0 & -\sin\phi & \cos\phi \end{pmatrix}^{-1} \begin{pmatrix} \cos\theta & 0 & -\sin\theta \\ 0 & 1 & 0 \\ \sin\theta & 0 & \cos\theta \end{pmatrix}^{-1} \begin{pmatrix} 0 \\ 0 \\ -g \end{pmatrix}$$

$$= \begin{pmatrix} 1 & 0 & 0 \\ 0 & \cos\phi & -\sin\phi \\ 0 & \sin\phi & \cos\phi \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix}$$

$$= \begin{pmatrix} \cos\theta & 0 & \sin\theta \\ \sin\phi\sin\theta & \cos\phi & -\sin\phi\cos\theta \\ -\cos\phi\sin\theta & \sin\phi & \cos\phi\cos\theta \end{pmatrix} \begin{pmatrix} 0 \\ 0 \\ -g \end{pmatrix}$$

$$= \begin{pmatrix} -g\sin\theta \\ g\sin\phi\cos\theta \\ -g\cos\phi\cos\theta \end{pmatrix}$$

(1-4) Vehicle and Three Axis Acceleration Sensor

The following describes the correlation between the vehicle and a three axis acceleration sensor which is installed in the monitor-integrated-type body mounted on the vehicle.

Figure 4:
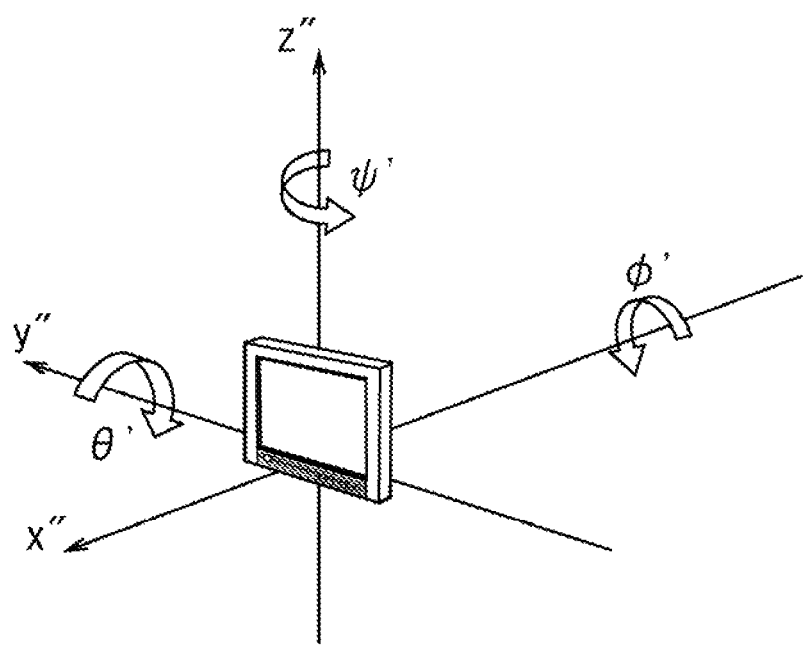
FIG. 4 is a schematic diagram illustrating a sensor coordinate system of an acceleration sensor attached to a vehicle.

(1-4-1) Vehicle Coordinate System for Vehicle and Sensor Coordinate System for Three Axis Acceleration Sensor While FIG. 3 illustrates the vehicle coordinate system (with x', y' and z' axes) for the vehicle on the inclined road, FIG. 4 illustrates a sensor coordinate system for the three axis acceleration sensor in the monitor-integrated-type body that is attached to the vehicle at a certain angle (also referred to as an "attachment angle"). The sensor coordinate system has x", y" and z" axes.

In the sensor coordinate system (with x", y" and z" axes) for the three axis acceleration sensor in the monitor-integrated-type body attached to the vehicle, a swing angle θ' around the y" axis represents the upward or downward direction (from the user's point of view) of the monitor-integrated-type body while a tilt angle φ' around the x" axis represents the right lower or left lower direction (from the user's point of view) of the monitor-integrated-type body. In addition, a pan angle ψ' around the z" axis represents the direction of the monitor-integrated-type body toward the driver sitting on the right seat or toward the passenger sitting on the left seat (from the user's point of view).

If the monitor-integrated-type body of the car navigation apparatus is upwardly attached from the user's point of view, the swing angle θ' around the y" axis is defined as follows:

$$\theta' > 0 \qquad (8)$$

If the monitor-integrated-type body is left-downwardly attached from the user's point of view, the tilt angle φ' around the x" axis is defined as follows:

$$\phi' > 0 \qquad (9)$$

If the monitor-integrated-type body is attached, from the user's point of view, such that it faces the driver's right seat, the pan angle ψ' around the Z" axis is defined as follows:

$$\phi' > 0 \qquad (10)$$

(1-4-2) Coordinate Transformation Equation for Vehicle Coordinate System and Sensor Coordinate System As for the vehicle coordinate system (with x', y' and z' axes) for the vehicle on the inclined road and the sensor coordinate system (with x", y" and z" axes) for the three axis acceleration sensor, a transformation matrix B is defined as follows:

$$B = \begin{pmatrix} 1 & 0 & 0 \\ 0 & \cos\phi' & \sin\phi' \\ 0 & -\sin\phi' & \cos\phi' \end{pmatrix} \begin{pmatrix} \cos\theta' & 0 & -\sin\theta' \\ 0 & 1 & 0 \\ \sin\theta' & 0 & \cos\theta' \end{pmatrix} \begin{pmatrix} \cos\varphi' & \sin\varphi' & 0 \\ -\sin\varphi' & \cos\varphi' & 0 \\ 0 & 0 & 1 \end{pmatrix} \qquad (11)$$

wherein, the transformation matrix B as a whole represents the attachment angle (attachment inclination) of the three axis acceleration sensor with respect to the vehicle, and, out of the elements of the transformation matrix B, $$\begin{pmatrix} \cos\theta' & 0 & -\sin\theta' \\ 0 & 1 & 0 \\ \sin\theta' & 0 & \cos\theta' \end{pmatrix}$$

represents the swing angle θ' round the y" axis or the upward and downward inclination of the attached sensor from the user's point of view, and $$\begin{pmatrix} 1 & 0 & 0 \\ 0 & \cos\phi' & \sin\phi' \\ 0 & -\sin\phi' & \cos\phi' \end{pmatrix}$$

represents the tilt angle φ' around the x" axis or the right lower and left lower inclinations of the attached sensor from the user's point of view, and $$\begin{pmatrix} \cos\varphi' & \sin\varphi' & 0 \\ -\sin\varphi' & \cos\varphi' & 0 \\ 0 & 0 & 1 \end{pmatrix}$$

represents the pan angle ψ' around the z" axis or the lateral inclination of the attached sensor facing toward the driver or passenger from the user's point of view.

In the transformation matrix B as indicated by the above (11) equation, the pan angle ψ', the swing angle θ' and the tilt angle φ' are multiplied in that order. This order is maintained in the following calculations.

In this manner, the multiplication order is maintained in this embodiment (i.e., the pan angle ψ', the swing angle θ' and the tilt angle φ'). Alternatively, a different order may be applied if this applied order can be maintained: If the lateral inclination of the road is expressed by using the three axes or the x", y" and z" axes, the tilt angle φ', the swing angle θ' and the pan angle ψ' may be multiplied in that order.

With respect to the sensor coordinate system (with x", y" and z" axes) for the three axis acceleration sensor, the vehicle coordinate system (with x', y' and z' axes) for the vehicle on the inclined road is expressed as follows:

$$\begin{pmatrix} x' \\ y' \\ z' \end{pmatrix} = B \cdot \begin{pmatrix} x'' \\ y'' \\ z'' \end{pmatrix} \quad (12)$$

Accordingly, transforming the above equation (12) presents the sensor coordinate system (with x", y" and z" axes) for the three axis acceleration sensor as follows:

$$\begin{pmatrix} x'' \\ y'' \\ z'' \end{pmatrix} = B^{-1} \begin{pmatrix} x' \\ y' \\ z' \end{pmatrix} \quad (13)$$

Since there is the above equation (6) as for the vehicle coordinate system (with x', y' and z' axes) for the vehicle on the inclined road, the sensor coordinate system (with x", y" and z" axes) for the three axis acceleration sensor can be represented as follows:

$$\begin{pmatrix} x'' \\ y'' \\ z'' \end{pmatrix} = B^{-1} \cdot A^{-1} \cdot \begin{pmatrix} x \\ y \\ z \end{pmatrix} \quad (14)$$

Accordingly, in the sensor coordinate system (with x", y" and z" axes) for the three axis acceleration sensor, the gravity acceleration g can be expressed as follows:

$$\begin{pmatrix} gx'' \\ gy'' \\ gz'' \end{pmatrix} = B^{-1} \cdot A^{-1} \cdot \begin{pmatrix} 0 \\ 0 \\ -g \end{pmatrix} \quad (15)$$

$$= \left\{ \begin{pmatrix} 1 & 0 & 0 \\ 0 & \cos\phi' & \sin\phi' \\ 0 & -\sin\phi' & \cos\phi' \end{pmatrix} \begin{pmatrix} \cos\theta' & 0 & -\sin\theta' \\ 0 & 1 & 0 \\ \sin\theta' & 0 & \cos\theta' \end{pmatrix} \begin{pmatrix} \cos\varphi' & \sin\varphi' & 0 \\ -\sin\varphi' & \cos\varphi' & 0 \\ 0 & 0 & 1 \end{pmatrix} \right\}^{-1}$$

$$\left\{ \begin{pmatrix} \cos\theta & 0 & -\sin\theta \\ 0 & 1 & 0 \\ \sin\theta & 0 & \cos\theta \end{pmatrix} \begin{pmatrix} 1 & 0 & 0 \\ 0 & \cos\phi & \sin\phi \\ 0 & -\sin\phi & \cos\phi \end{pmatrix} \right\}^{-1} \begin{pmatrix} 0 \\ 0 \\ -g \end{pmatrix}$$

$$= \begin{pmatrix} \cos\varphi' & -\sin\varphi' & 0 \\ \sin\varphi' & \cos\varphi' & 0 \\ 0 & 0 & 1 \end{pmatrix} \begin{pmatrix} \cos\theta' & 0 & \sin\theta' \\ 0 & 1 & 0 \\ -\sin\theta' & 0 & \cos\theta' \end{pmatrix} \begin{pmatrix} 1 & 0 & 0 \\ 0 & \cos\phi' & -\sin\phi' \\ 0 & \sin\phi' & \cos\phi' \end{pmatrix}$$

$$\begin{pmatrix} 1 & 0 & 0 \\ 0 & \cos\phi & -\sin\phi \\ 0 & \sin\phi & \cos\phi \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix}$$

$$= \begin{pmatrix} \cos\varphi'\cos\theta' & -\sin\varphi' & \cos\varphi'\sin\theta' \\ \sin\varphi'\cos\theta' & \cos\varphi' & \sin\varphi'\sin\theta' \\ -\sin\theta' & 0 & \cos\theta' \end{pmatrix} \begin{pmatrix} 1 & 0 & 0 \\ 0 & \cos(\phi'+\phi) & -\sin(\phi'+\phi) \\ 0 & \sin(\phi'+\phi) & \cos(\phi'+\phi) \end{pmatrix}$$

$$\begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix}$$

$$= \begin{pmatrix} \cos\varphi'\cos\theta' & \begin{array}{l} -\sin\varphi'\cos(\phi'+\phi)+ \\ \cos\varphi'\theta'\sin(\phi'+\phi) \end{array} & \begin{array}{l} \sin\varphi'\sin(\phi'+\phi)+ \\ \cos\varphi'\sin\theta'\cos(\phi'+\phi) \end{array} \\ \sin\varphi'\cos\theta' & \begin{array}{l} \cos\varphi'\cos(\phi'+\phi)+ \\ \sin\varphi'\sin\theta'\sin(\phi'+\phi) \end{array} & \begin{array}{l} -\cos\varphi'\sin(\phi'+\phi)+ \\ \sin\varphi'\sin\theta'\cos(\phi'+\phi) \end{array} \\ -\sin\theta' & \cos\theta'\sin(\phi'+\phi) & \cos\theta'\cos(\phi'+\phi) \end{pmatrix}$$

$$\begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix}$$

In the above equation (15) for the gravity acceleration g, the inverse matrix $B^{-1}$ of the transformation matrix B represents the inclination of the three axis acceleration sensor with respect to the vehicle while the inverse matrix $A^{-1}$ of the transformation matrix A represents the inclination of the vehicle with respect to the ground surface.

If the three axis acceleration sensor is attached to the vehicle at a certain angle to the vehicle which is on the road at a certain angle with respect to the flat ground surface, the gravity acceleration g is expressed as follows:

$$\begin{pmatrix} gx'' \\ gy'' \\ gz'' \end{pmatrix} = \begin{pmatrix} \cos\varphi'\cos\theta' & \begin{matrix} -\sin\varphi'\cos(\phi'+\phi)+ \\ \cos\varphi'\sin\theta'\sin(\phi'+\phi) \end{matrix} & \begin{matrix} \sin\varphi'\sin(\phi'+\phi)+ \\ \cos\varphi'\sin\theta'\cos(\phi'+\phi) \end{matrix} \\ \sin\varphi'\cos\theta' & \begin{matrix} \cos\varphi'\cos(\phi'+\phi)+ \\ \sin\varphi'\sin\theta'\sin(\phi'+\phi) \end{matrix} & \begin{matrix} -\cos\varphi'\sin(\phi'+\phi)+ \\ \sin\varphi'\sin\theta'\cos(\phi'+\phi) \end{matrix} \\ -\sin\theta' & \cos\theta'\sin(\phi'+\phi) & \cos\theta'\cos(\phi'+\phi) \end{pmatrix} \begin{pmatrix} -g\sin\theta \\ 0 \\ -g\cos\theta \end{pmatrix} \quad (16)$$

On the other hand, as for the sensor coordinate system (with x", y" and z" axes) for the three axis acceleration sensor, there may be a case in which the three axis acceleration sensor, attached to the vehicle, is not inclined with respect to the vehicle. However, since the road can be inclined in the forward or backward direction or in the lateral direction, the three axis acceleration sensor may be inclined with respect to the ground surface. In this case, the gravity acceleration g is represented as follows:

$$\begin{pmatrix} gx'' \\ gy'' \\ gz'' \end{pmatrix} = \begin{pmatrix} -g\sin\theta \\ g\sin\phi\cos\theta \\ -g\cos\phi\cos\theta \end{pmatrix} \quad (17)$$

Similarly, as for the sensor coordinate system (with x", y" and z" axes) for the three axis acceleration sensor, there may be a case in which the vehicle is not inclined with respect to the ground surface due to the road not being inclined in the forward and backward direction or in the lateral direction. However, the three axis acceleration sensor, attached to the vehicle, can be inclined at a certain angle with respect to the vehicle. In this case, the gravity acceleration g is expressed as follows:

$$\begin{pmatrix} gx'' \\ gy'' \\ gz'' \end{pmatrix} = \begin{pmatrix} -g(\sin\varphi'\sin\phi' + \cos\varphi'\sin\theta'\cos\phi') \\ -g(-\cos\varphi'\sin\phi' + \sin\varphi'\sin\theta'\cos\phi') \\ -g\cos\phi'\cos\theta' \end{pmatrix} \quad (18)$$

Moreover, as for the sensor coordinate system (with x", y" and z" axes) for the three axis acceleration sensor, there may be a case in which the road is inclined in the forward or backward direction but not in the lateral direction. In addition, the three axis acceleration sensor, attached to the vehicle, may not be inclined with respect to the vehicle. In this case, the gravity acceleration g is represented as follows:

$$\begin{pmatrix} gx'' \\ gy'' \\ gz'' \end{pmatrix} = \begin{pmatrix} -g\sin\theta \\ 0 \\ -g\cos\theta \end{pmatrix} \quad (19)$$

(1-4-3) Motion Acceleration for Three Axis Acceleration Sensor (Acceleration in the Direction of the Motion and Lateral Acceleration G)

In the sensor coordinate system (with x", y" and z" axes) for the three axis acceleration sensor, the acceleration in the direction of the vehicle's motion and the lateral acceleration G will also be represented as $\alpha x$ and $\alpha y$, respectively. There may be a case in which the road is not inclined in the forward and backward direction and in the lateral direction while the three axis acceleration sensor, attached to the vehicle, is inclined with respect to the vehicle. In this case, by using the inverse matrix $B^{-1}$ of the transformation matrix B, the acceleration in the direction of the motion (also referred to as "travel direction acceleration") $\alpha x$ and the lateral acceleration $\alpha y$, from the viewpoint where the three axis acceleration sensor is located, are expressed as follows:

$$\begin{pmatrix} \alpha x'' \\ \alpha y'' \\ \alpha z'' \end{pmatrix} = B^{-1} \cdot \begin{pmatrix} \alpha x \\ \alpha y \\ 0 \end{pmatrix} \quad (20)$$

Accordingly, expanding the above equation by using the inverse matrix $B^{-1}$ presents:

$$\begin{pmatrix} \alpha x'' \\ \alpha y'' \\ \alpha z'' \end{pmatrix} = \left\{ \begin{pmatrix} 1 & 0 & 0 \\ 0 & \cos\phi' & \sin\phi' \\ 0 & -\sin\phi' & \cos\phi' \end{pmatrix} \begin{pmatrix} \cos\theta' & 0 & -\sin\theta' \\ 0 & 1 & 0 \\ \sin\theta' & 0 & \cos\theta' \end{pmatrix} \begin{pmatrix} \cos\varphi' & \sin\varphi' & 0 \\ -\sin\varphi' & \cos\varphi' & 0 \\ 0 & 0 & 1 \end{pmatrix} \right\}^{-1} \begin{pmatrix} \alpha x \\ \alpha y \\ 0 \end{pmatrix} \quad (21)$$

$$= \begin{pmatrix} \cos\varphi'\cos\theta' & -\sin\varphi'\cos\phi' + \cos\varphi'\sin\theta'\sin\phi' & \sin\varphi'\sin\phi' + \cos\varphi'\sin\theta'\cos\phi' \\ \sin\varphi'\cos\theta' & \cos\varphi'\cos\phi' + \sin\varphi'\sin\theta'\sin\phi' & -\cos\varphi'\sin\phi' + \sin\varphi'\sin\theta'\cos\phi' \\ -\sin\theta' & \cos\theta'\sin\phi' & \cos\theta'\cos\phi' \end{pmatrix} \begin{pmatrix} \alpha x \\ \alpha y \\ 0 \end{pmatrix}$$

$$= \begin{pmatrix} \alpha x(\cos\varphi'\cos\theta') + \alpha y(-\sin\varphi'\cos\phi' + \cos\varphi'\sin\theta'\sin\phi') \\ \alpha x(\sin\varphi'\cos\theta') + \alpha y(\cos\varphi'\cos\phi' + \sin\varphi'\sin\theta'\sin\phi') \\ \alpha x(-\sin\theta') + \alpha y(\cos\theta'\sin\phi') \end{pmatrix}$$

By the way, considering the fact that the accelerating vehicle is affected by the backward gravity and that the vehicle turning right is affected by the leftward centrifugal force, the minus or plus signs are selected for the tilt angle φ', swing angle θ' and pan angle ψ' of the three axis acceleration sensor.

If the three axis acceleration sensor, attached to the vehicle, is not inclined with respect to the vehicle, there is no need to use the inverse matrix $B^{-1}$ of the transformation matrix B in the above equation (20). The motion acceleration α therefore can be expressed as follows:

$$\begin{pmatrix} \alpha x'' \\ \alpha y'' \\ \alpha z'' \end{pmatrix} = \begin{pmatrix} \alpha x \\ \alpha y \\ 0 \end{pmatrix} \tag{22}$$

(1-5) Values Observed by the Three Axis Acceleration Sensor

If the combination of the gravity acceleration g in the sensor coordinate system (with x", y" and z" axes) for the three axis acceleration sensor and the motion acceleration α is defined as a three axis acceleration sensor observation value As, the three axis acceleration sensor observation value As, based on the above equations (15) and (20), can be expressed as follows:

$$\begin{pmatrix} A_s x'' \\ A_s y'' \\ A_s z'' \end{pmatrix} = \begin{pmatrix} gx'' \\ gy'' \\ gz'' \end{pmatrix} + \begin{pmatrix} \alpha x'' \\ \alpha y'' \\ \alpha z'' \end{pmatrix} = B^{-1} \left\{ A^{-1} \cdot \begin{pmatrix} 0 \\ 0 \\ -g \end{pmatrix} + \begin{pmatrix} \alpha x \\ \alpha y \\ 0 \end{pmatrix} \right\} \tag{23}$$

Expanding the above equation (23) presents the three axis acceleration sensor observation value As in the following manner:

$$\begin{pmatrix} A_s x'' \\ A_s y'' \\ A_s z'' \end{pmatrix} = \begin{pmatrix} gx'' \\ gy'' \\ gz'' \end{pmatrix} + \begin{pmatrix} \alpha x'' \\ \alpha y'' \\ \alpha z'' \end{pmatrix} \tag{24}$$

$$= \begin{pmatrix} \cos\varphi'\cos\theta' & \begin{array}{c} -\sin\phi'\cos(\phi'+\phi)+ \\ \cos\varphi'\sin\theta'\sin(\phi'+\phi) \end{array} & \begin{array}{c} \sin\varphi'\sin(\phi'+\phi)+ \\ \cos\varphi'\sin\theta'\cos(\phi'+\phi) \end{array} \\ \sin\varphi'\cos\theta' & \begin{array}{c} \cos\varphi'\cos(\phi'+\phi)+ \\ \sin\varphi'\sin\theta'\sin(\phi'+\phi) \end{array} & \begin{array}{c} -\cos\varphi\sin(\phi'+\phi)+ \\ \sin\varphi'\sin\theta'\cos(\phi'+\phi) \end{array} \\ -\sin\theta' & \cos\theta'\sin(\phi'+\phi) & \cos\theta'\cos(\phi'+\phi) \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} 0 \\ 0 \\ -g \end{pmatrix} +$$

$$\begin{pmatrix} \alpha x'' \\ \alpha y'' \\ \alpha z'' \end{pmatrix}$$

$$= \begin{pmatrix} \cos\varphi'\cos\theta' & \begin{array}{c} -\sin\phi'\cos(\phi'+\phi)+ \\ \cos\varphi'\sin\theta'\sin(\phi'+\phi) \end{array} & \begin{array}{c} \sin\varphi'\sin(\phi'+\phi)+ \\ \cos\varphi'\sin\theta'\cos(\phi'+\phi) \end{array} \\ \sin\varphi'\cos\theta' & \begin{array}{c} \cos\varphi'\cos(\phi'+\phi)+ \\ \sin\varphi'\sin\theta'\sin(\phi'+\phi) \end{array} & \begin{array}{c} -\cos\varphi'\sin(\phi'+\phi)+ \\ \sin\varphi'\sin\theta'\cos(\phi'+\phi) \end{array} \\ -\sin\theta' & \cos\theta'\sin(\phi'+\phi) & \cos\theta'\cos(\phi'+\phi) \end{pmatrix} \begin{pmatrix} -g\sin\theta \\ 0 \\ -g\cos\theta \end{pmatrix} + \begin{pmatrix} \alpha x'' \\ \alpha y'' \\ \alpha z'' \end{pmatrix}$$

However, if the road is inclined only in the forward and backward direction not in the lateral direction, the tilt angle φ of the above equation (24) becomes zero. Accordingly, the three axis acceleration sensor observation value As becomes:

$$= \begin{pmatrix} \cos\varphi'\cos\theta' & -\sin\varphi'\cos\phi'+\cos\varphi'\sin\theta'\sin\phi' & \sin\varphi'\sin\phi'+\cos\varphi'\sin\theta'\cos\phi' \\ \sin\varphi'\cos\theta' & \cos\varphi'\cos\phi'+\sin\varphi'\sin\theta'\sin\phi' & -\cos\varphi'\sin\phi'+\sin\varphi'\sin\theta'\cos\phi' \\ -\sin\theta' & \cos\theta'\sin\phi' & \cos\theta'\cos\phi' \end{pmatrix} \begin{pmatrix} -g\sin\theta \\ 0 \\ -g\cos\theta \end{pmatrix} + \begin{pmatrix} \alpha x'' \\ \alpha y'' \\ \alpha z'' \end{pmatrix} \tag{25}$$

$$= \begin{pmatrix} -g\sin\theta\cos\varphi'\cos\theta' - g\cos\theta(\sin\varphi'\sin\phi'+\cos\varphi'\sin\theta'\cos\phi') \\ -g\sin\theta\sin\varphi'\cos\theta' - g\cos\theta(-\cos\varphi'\sin\phi'+\sin\varphi'\sin\theta'\cos\phi') \\ g\sin\theta\sin\theta' - g\cos\theta\cos\theta'\cos\phi' \end{pmatrix} +$$

$$\begin{pmatrix} \alpha x(\cos\varphi'\cos\theta') + \alpha y(-\sin\varphi'\cos\phi'+\cos\varphi'\sin\theta'\sin\phi') \\ \alpha x(\sin\varphi'\cos\theta') + \alpha y(\cos\varphi'\cos\phi'+\sin\varphi'\sin\theta'\sin\phi') \\ \alpha x(-\sin\theta') + \alpha y(\cos\theta'\sin\phi') \end{pmatrix}$$

If the three axis acceleration sensor, attached to the vehicle, is not inclined with respect to the vehicle while the road is inclined in the forward or backward direction, the three axis acceleration sensor observation value As becomes:

$$\begin{pmatrix} A_s x'' \\ A_s y'' \\ A_s z'' \end{pmatrix} = \begin{pmatrix} -g\sin\theta + \alpha x \\ g\sin\phi\cos\theta + \alpha y \\ -g\cos\phi\cos\theta \end{pmatrix} \quad (26)$$

If the three axis acceleration sensor, attached to the vehicle, is inclined with respect to the vehicle while the road is not inclined in the forward or backward direction, the three axis acceleration sensor observation value As becomes:

$$\begin{pmatrix} A_s x'' \\ A_s y'' \\ A_s z'' \end{pmatrix} = \begin{pmatrix} -g(\sin\varphi'\sin\phi' + \cos\varphi'\sin\theta'\cos\phi') + \\ \alpha x(\cos\varphi'\cos\theta') + \alpha y(-\sin\varphi'\cos\phi' + \cos\varphi'\sin\theta'\sin\phi') \\ -g(-\cos\varphi'\sin\phi' + \sin\varphi'\sin\theta'\cos\phi') + \\ \alpha x(\sin\varphi'\cos\theta') + \alpha y(\cos\varphi'\cos\phi' + \sin\varphi'\sin\theta'\sin\phi') \\ -g\cos\theta'\cos\phi' + \alpha x(-\sin\theta') + \alpha y(\cos\theta'\sin\phi') \end{pmatrix} \quad (27)$$

If the three axis acceleration sensor, attached to the vehicle, is not inclined with respect to the vehicle while the road is inclined in the forward or backward direction, the three axis acceleration sensor observation value As becomes:

$$\begin{pmatrix} A_s x'' \\ A_s y'' \\ A_s z'' \end{pmatrix} = \begin{pmatrix} -g\sin\theta + \alpha x \\ \alpha y \\ -g\cos\theta \end{pmatrix} \quad (28)$$

If there are neither the acceleration in the direction of the motion αx nor the lateral acceleration αy while the road is inclined in the forward or backward direction and the three axis acceleration sensor, attached to the vehicle, is inclined with respect to the vehicle, the three axis acceleration sensor observation value As becomes:

$$\begin{pmatrix} A_s x'' \\ A_s y'' \\ A_s z'' \end{pmatrix} = \begin{pmatrix} -g\sin\theta\cos\varphi'\cos\theta' - g\cos\theta(\sin\varphi'\sin\phi' + \cos\varphi'\sin\theta'\cos\phi') \\ -g\sin\theta\sin\varphi'\cos\theta' - g\cos\theta(-\cos\varphi'\sin\phi' + \sin\varphi'\sin\theta'\cos\phi') \\ g\sin\theta\sin\theta' - g\cos\theta\cos\theta'\cos\phi' \end{pmatrix} \quad (29)$$

(1-5-1) Zero Point Offset and Gain of the Three Axis Acceleration Sensor

As for the three axis acceleration sensor observation value As, which is also represented by voltage, a zero point offset OF and gain GE of the three axis acceleration sensor may need to be taken into consideration.

The zero point offset OF of the three axis acceleration sensor represents the voltage values (mV) being generated at the x" axis, the y" axis and the z" axis while the three axis acceleration sensor is not being affected by any acceleration components.

The gain GE of the three axis acceleration sensor represents the degree of the voltage values (V/(m/sec²)) being generated at the x" axis, the y" axis and the z" axis when there is, for example, a load of 1 g on the three axis acceleration sensor.

When the zero point offset OF the gain GE are taken into consideration, the three axis acceleration sensor observation value AD is expressed as follows, based on the above equation (23):

$$\begin{pmatrix} ADx'' \\ ADy'' \\ ADz'' \end{pmatrix} = GE \cdot \begin{pmatrix} A_s x'' \\ A_s y'' \\ A_s z'' \end{pmatrix} + OF \quad (30)$$

$$= GE \cdot B^{-1} \left( A^{-1} \cdot \begin{pmatrix} 0 \\ 0 \\ -g \end{pmatrix} + \begin{pmatrix} \alpha x \\ \alpha y \\ 0 \end{pmatrix} \right) + OF$$

wherein the unit of the three axis acceleration sensor observation value As is m/sec² while the unit of the three axis acceleration sensor observation value AD is mV.

In that case, the zero point offset OF becomes:

$$OF = \begin{pmatrix} OFx \\ OFy \\ OFz \end{pmatrix} \quad (31)$$

Moreover, the gain GE becomes:

$$GE = \begin{pmatrix} GEx & 0 & 0 \\ 0 & GEy & 0 \\ 0 & 0 & GEz \end{pmatrix} \quad (32)$$

Accordingly, when the zero point offset OF and the gain GE are taken into consideration, the three axis acceleration sensor observation value AD is expressed as follows:

$$\begin{pmatrix} ADx'' \\ ADy'' \\ ADz'' \end{pmatrix} = \begin{pmatrix} GEx & 0 & 0 \\ 0 & GEy & 0 \\ 0 & 0 & GEz \end{pmatrix} \begin{pmatrix} A_s x'' \\ A_s y'' \\ A_s z'' \end{pmatrix} + \begin{pmatrix} OFx \\ OFy \\ OFz \end{pmatrix} \quad (33)$$

In that case, out of the elements of the above equation (33), the following values are unknown: the gain GEx, GEy and GEz, the zero point offset OFx, OFy and OFz, the tilt angle φ', swing angle θ' and pan angle ψ' of the three axis acceleration sensor attached to the vehicle, the swing angle θ representing the forward or backward inclination of the road (as for the three axis acceleration sensor observation value As) and the tilt angle φ representing the lateral inclination of the road (as for the three axis acceleration sensor observation value As). However, the gain GEx, GEy and GEz can be determined from the specifics of the three axis acceleration sensor or by measuring the actual values. The swing angle θ representing the forward or backward inclination of the road can be calculated from the altitude information detected by an air pressure sensor, which is installed in the monitor-integrated-type body of the car navigation apparatus. On the other hand, the tilt angle φ representing the lateral inclination of the road may be set at zero although this may cause some errors.

The other values, such as the gravity acceleration g, can be calculated: The GPS signal is acquired from the GPS satellite to calculate the latitude of the current position and then the gravity acceleration g may be figured out from a latitude-gravity acceleration conversion table in which the degrees of latitude are associated with the values of the gravity acceleration.

In addition, the acceleration in the direction of the vehicle's motion αx may be calculated as a reference based on the vehicles's speed, which is calculated from the GPS signals. Moreover, the lateral acceleration αy of the vehicle can be also calculated as a reference based on the direction the vehicle headed for and the vehicle's speed, which are calculated from the GPS signals.

As a result, as for the above equation (33), the still unknown numbers are: the zero point offset OFx, OFy and OFz of the three axis acceleration sensor; and the tilt angle φ', the swing angle θ' and the pan angle ψ', each of which indicates the attachment angle of the three axis acceleration sensor with respect to the vehicle. Those six numbers will be calculated.

(1-6) Learning of Three Axis Acceleration Sensor's Attachment Angle and Zero Point Offset Here, the three axis acceleration sensor observation value AD is regarded as "I" while the zero point offset OFx, OFy and OFz of the three axis acceleration sensor and the gain GEx, GEy and GEz are taken into consideration. Moreover, the elements of the above equation (30) are defined as follows:

$$A^{-1} \cdot \begin{pmatrix} 0 \\ 0 \\ -g \end{pmatrix} + \begin{pmatrix} ax \\ ay \\ 0 \end{pmatrix} = \begin{pmatrix} Ex \\ Ey \\ Ez \end{pmatrix} = E \quad (34)$$

In this case, the above "I", or the three axis acceleration sensor observation value AD, is expressed as follows:

$$I = GE \cdot B^{-1} \cdot E + OF \quad (35)$$

By the way, "Sθ" and "Cθ" in the equations represent sinθ and cosθ, respectively.

The inverse matrix $A^{-1}$ of the transformation matrix A in the above equation (34) represents the forward or backward inclination of the road with respect to the flat ground surface: This can be obtained based on the altitude information, which is acquired from the result (atmospheric pressure) of the barometer. In addition, the gravity acceleration g, the acceleration in the direction of the motion αx and the lateral acceleration αy can be calculated as references, as noted above. Accordingly, "E" in the above equation (35) is already known.

By using the inverse matrix $A^{-1}$ of the transformation matrix A as indicated by the above equation (5), the known "E" can be transformed in the following manner:

$$\begin{pmatrix} Ex \\ Ey \\ Ez \end{pmatrix} = A^{-1} \cdot \begin{pmatrix} 0 \\ 0 \\ -g \end{pmatrix} + \begin{pmatrix} ax \\ ay \\ 0 \end{pmatrix} = \begin{pmatrix} C_\theta & 0 & S_\theta \\ 0 & 1 & 0 \\ -S_\theta & 0 & C_\theta \end{pmatrix} \begin{pmatrix} 0 \\ 0 \\ -g \end{pmatrix} + \begin{pmatrix} ax \\ ay \\ 0 \end{pmatrix} \quad (36)$$

$$= \begin{pmatrix} -S_\theta g + \alpha x \\ \alpha y \\ -C_\theta g \end{pmatrix}$$

Accordingly, as for the above equation (35), the still unknown numbers are: the tilt angle φ', the swing angle θ' and the pan angle ψ', each of which indicates the attachment angle of the three axis acceleration sensor with respect to the vehicle; and the zero point offset OFx, OFy and OFz of the three axis acceleration sensor. The three axis acceleration sensor observation value AD can be transformed in the following manner:

$$\begin{pmatrix} ADx'' \\ ADy'' \\ ADz'' \end{pmatrix} = \begin{pmatrix} GEx & 0 & 0 \\ 0 & GEy & 0 \\ 0 & 0 & GEz \end{pmatrix} \quad (37)$$

$$\begin{pmatrix} C_{\varphi'} C_{\theta'} & -S_{\varphi'} C_{\phi'} + C_{\varphi'} S_{\theta'} S_{\phi'} & S_{\varphi'} S_{\phi'} + C_{\varphi'} S_{\theta'} C_{\phi'} \\ S_{\varphi'} C_{\theta'} & C_{\varphi'} C_{\phi'} + S_{\varphi'} S_{\theta'} S_{\phi'} & -C_{\varphi'} S_{\phi'} + S_{\varphi'} S_{\theta'} C_{\phi'} \\ -S_{\theta'} & C_{\theta'} S_{\phi'} & C_{\theta'} C_{\phi'} \end{pmatrix}$$

$$\begin{pmatrix} Ex \\ Ey \\ Ez \end{pmatrix} + \begin{pmatrix} OFx \\ OFy \\ OFz \end{pmatrix}$$

$$= \begin{pmatrix} GEx\{Ex(C_{\varphi'} C_{\theta'}) + Ey(-S_{\varphi'} C_{\phi'} + C_{\varphi'} S_{\theta'} S_{\phi'}) + Ez(S_{\varphi'} S_{\phi'} + C_{\varphi'} S_{\theta'} C_{\phi'})\} + OFx \\ GEy\{Ex(S_{\varphi'} C_{\theta'}) + Ey(C_{\varphi'} C_{\phi'} + S_{\varphi'} S_{\theta'} S_{\phi'}) + Ez(-C_{\varphi'} S_{\phi'} + S_{\varphi'} S_{\theta'} C_{\phi'})\} + OFy \\ GEz\{Ex(-S_{\theta'}) + Ey(C_{\theta'} S_{\phi'}) + Ez(S_{\theta'} C_{\phi'})\} + OFz \end{pmatrix}$$

The above equation (37) is transformed into three function expressions fx, fy and fz for the Newton-Raphson Method as follows:

$$fx(\varphi', \theta', \phi', OFx, OFy, OFz, GEx, GEy, GEz) = \quad (38)$$
$$ADx'' - GEx\{Ex(C_{\varphi'} C_{\theta'}) + Ey(-S_{\varphi'} C_{\phi'} + C_{\varphi'} S_{\theta'} S_{\phi'}) +$$
$$Ez(S_{\varphi'} S_{\phi'} + C_{\varphi'} S_{\theta'} C_{\phi'})\} - OFx = 0$$

$$fy(\varphi', \theta', \phi', OFx, OFy, OFz, GEx, GEy, GEz) = \quad (39)$$
$$ADy'' - GEy\{Ex(S_{\varphi'} C_{\theta'}) + Ey(C_{\varphi'} C_{\phi'} + S_{\varphi'} S_{\theta'} S_{\phi'}) +$$
$$Ez(-C_{\varphi'} S_{\phi'} + S_{\varphi'} S_{\theta'} C_{\phi'})\} - OFy = 0$$

$$fz(\varphi', \theta', \phi', OFx, OFy, OFz, GEx, GEy, GEz) = \quad (40)$$
$$ADz'' - GEz\{Ex(-S_{\theta'}) + Ey(C_{\theta'} S_{\phi'}) + Ez(C_{\theta'} C_{\phi'})\} - OFz = 0$$

As for those three function formulas fx, fy and fz, there are totally six unknown numbers (the zero point offset OFx, OFy and OFz, the tilt angle φ', the swing angle θ' and the pan angle ψ') in the above equations (38) to (40). This means those equations may not be able to be solved.

by the way, the known "E" in the equations (38) to (40) varies according to the GPS signals, which are acquired every second. Accordingly, at least two seconds later, six different function formulas fx1, fy1, fz1, fx2, fy2 and fz2 may be obtained as a result of change of the known "E". However, various function formulas may not be obtained unless the vehicle's speed changes. Therefore, various function formulas fx1 to fxt, fy1 to fyt and fz1 to fzt have been acquired for ten seconds during which the vehicle's speed may change.

In that case, the number of the function formula (fx1 to fxt, fy1 to fyt and fz1 to fzt) are larger than the number of the unknown values (i.e. 6). Accordingly, the least squares method is used to obtain values which may satisfy the unknowns of the function formulas (fx1 to fxt, fy1 to fyt and fz1 to fzt).

Considering the multidimensional Newton Raphson method, a variation δ in the basic one-dimensional Newton Raphson method is expressed as follows:

$$\delta = x_{i+1} - x_i = -\frac{f(x_i)}{f'(x_i)} \quad (41)$$

In the Newton Raphson method, when the variation δ becomes less or equal to a predetermined convergence threshold the true answers for the unknowns are considered to have been acquired.

Transforming the above equation (41) presents:

$$f'(x_i)\delta = -f(x_i) \quad (42)$$

Considering N dimension, that equation (42) can be also expressed as follows:

$$\begin{pmatrix} \frac{\partial f_1}{\partial x_1} & \frac{\partial f_1}{\partial x_2} & \cdots & \frac{\partial f_1}{\partial x_N} \\ \frac{\partial f_2}{\partial x_1} & \frac{\partial f_2}{\partial x_2} & \cdots & \frac{\partial f_2}{\partial x_N} \\ \vdots & \vdots & \ddots & \vdots \\ \frac{\partial f_N}{\partial x_1} & \frac{\partial f_N}{\partial x_2} & \cdots & \frac{\partial f_N}{\partial x_N} \end{pmatrix} \begin{pmatrix} \delta x_1 \\ \delta x_2 \\ \vdots \\ \delta x_N \end{pmatrix} = - \begin{pmatrix} f_1 \\ f_2 \\ \vdots \\ f_N \end{pmatrix} \quad (43)$$

Accordingly, the variation δ is obtained based on the following equation:

$$\begin{pmatrix} \frac{\partial (f_{x1})_i}{\partial (\varphi')_i} & \frac{\partial (f_{x1})_i}{\partial (\theta')_i} & \frac{\partial (f_{x1})_i}{\partial (\phi')_i} & \frac{\partial (f_{x1})_i}{\partial (OFx)_i} & \frac{\partial (f_{x1})_i}{\partial (OFy)_i} & \frac{\partial (f_{x1})_i}{\partial (OFz)_i} \\ \frac{\partial (f_{y1})_i}{\partial (\varphi')_i} & \frac{\partial (f_{y1})_i}{\partial (\theta')_i} & \frac{\partial (f_{y1})_i}{\partial (\phi')_i} & \frac{\partial (f_{y1})_i}{\partial (OFx)_i} & \frac{\partial (f_{y1})_i}{\partial (OFy)_i} & \frac{\partial (f_{y1})_i}{\partial (OFz)_i} \\ \frac{\partial (f_{z1})_i}{\partial (\varphi')_i} & \frac{\partial (f_{z1})_i}{\partial (\theta')_i} & \frac{\partial (f_{z1})_i}{\partial (\phi')_i} & \frac{\partial (f_{z1})_i}{\partial (OFx)_i} & \frac{\partial (f_{z1})_i}{\partial (OFy)_i} & \frac{\partial (f_{z1})_i}{\partial (OFz)_i} \\ \frac{\partial (f_{x2})_i}{\partial (\varphi')_i} & \frac{\partial (f_{x2})_i}{\partial (\theta')_i} & \frac{\partial (f_{x2})_i}{\partial (\phi')_i} & \frac{\partial (f_{x2})_i}{\partial (OFx)_i} & \frac{\partial (f_{x2})_i}{\partial (OFy)_i} & \frac{\partial (f_{x2})_i}{\partial (OFz)_i} \\ \frac{\partial (f_{y2})_i}{\partial (\varphi')_i} & \frac{\partial (f_{y2})_i}{\partial (\theta')_i} & \frac{\partial (f_{y2})_i}{\partial (\phi')_i} & \frac{\partial (f_{y2})_i}{\partial (OFx)_i} & \frac{\partial (f_{y2})_i}{\partial (OFy)_i} & \frac{\partial (f_{y2})_i}{\partial (OFz)_i} \\ \frac{\partial (f_{z2})_i}{\partial (\varphi')_i} & \frac{\partial (f_{z2})_i}{\partial (\theta')_i} & \frac{\partial (f_{z2})_i}{\partial (\phi')_i} & \frac{\partial (f_{z2})_i}{\partial (OFx)_i} & \frac{\partial (f_{z2})_i}{\partial (OFy)_i} & \frac{\partial (f_{z2})_i}{\partial (OFz)_i} \\ \vdots & \vdots & \vdots & \vdots & \vdots & \vdots \end{pmatrix} \quad (44)$$

$$\begin{pmatrix} (\delta\varphi')_i \\ (\delta\theta')_i \\ (\delta\phi')_i \\ (\delta OFx)_i \\ (\delta OFy)_i \\ (\delta OFz)_i \end{pmatrix} = - \begin{pmatrix} (f_{x1})_i \\ (f_{y1})_i \\ (f_{z1})_i \\ (f_{x2})_i \\ (f_{y2})_i \\ (f_{z2})_i \\ \vdots \end{pmatrix}$$

That is, to solve the least squares problem, the left element (partial derivatives) in the left side of the above equation (44) and its right side (function formulas) are calculated to acquire the variation δ.

By using the acquired variation δ, the answers to the unknowns can be obtained as follows:

$$\begin{pmatrix} (\varphi')_{i+1} \\ (\theta')_{i+1} \\ (\phi')_{i+1} \\ (OFx)_{i+1} \\ (OFy)_{i+1} \\ (OFx)_{i+1} \end{pmatrix} = \begin{pmatrix} (\varphi')_i \\ (\theta')_i \\ (\phi')_i \\ (OFx)_i \\ (OFy)_i \\ (OFx)_i \end{pmatrix} + \begin{pmatrix} (\delta\varphi')_i \\ (\delta\theta')_i \\ (\delta\phi')_i \\ (\delta OFx)_i \\ (\delta OFy)_i \\ (\delta OFx)_i \end{pmatrix} \quad (45)$$

Using the answers, which are indicated in the left side of the above equation (45), the variation δ is acquired again based on the above equation (44). After that, using the acquired variation δ, the answers to the unknowns are calculated again based on the above equation (45). That process is repeated a predetermined number of times.

By the way, the initial values for the first element in the right side of the above equation (45) may become:

$$\begin{pmatrix} (\varphi')_0 \\ (\theta')_0 \\ (\phi')_0 \\ (OFx)_0 \\ (OFy)_0 \\ (OFz)_0 \end{pmatrix} = \begin{pmatrix} 0[rad] \\ 0[rad] \\ 0[rad] \\ 2.5[V] \\ 2.5[V] \\ 2.5[V] \end{pmatrix} \quad (46)$$

As for the initial values of the above equation (46), the tilt angle $(\phi')_0$, the swing angle $(\theta')_0$ and the pan angle $(\psi')_0$ are 0 deg. In addition, the zero point offset $(OFx)_0$, $(OFy)_0$ and $(OFz)_0$ may be at the voltage of 2.5 v, which indicates that the three axis acceleration sensor is not affected by the acceleration, if the voltage can change within a range of 0 to 5 v in accordance with the acceleration affecting the three axis acceleration sensor.

The left side of the above equation (45) presents the final answer. The first element in the right side of the equation (45) represents the previous answer (i.e., the result of learning) calculated based on the equation (45). The second element in the right side of the equation (45) represents the variation δ of the above equation (44). Based on the left side of the equation (45), all the unknowns (the zero point offset OFx, OFy and OFz; and the tilt angle φ', the swing angle θ' and the pan angle ψ', each of which indicates the attachment angle of the three axis acceleration sensor with respect to the vehicle) are acquired.

In that manner, while receiving the GPS signals, the car navigation apparatus calculates the zero point offset OFx, OFy and OFz, the tilt angle φ', the swing angle θ' and the pan angle ψ'. During the time when the GPS signals are not received due to the vehicle running inside tunnels or the like, the car navigation apparatus uses: the zero point offset OFx, OFy and OFz of the three axis acceleration sensor; and the tilt angle φ', the swing angle θ' and the pan angle ψ', each of which indicates the attachment angle of the three axis acceleration sensor with respect to the vehicle. In addition, the car navigation apparatus estimates, based on the altitude difference of the road and the other observation results (such as the motion acceleration α of the three axis acceleration sensor and the gravity acceleration g), the acceleration in the direction of the vehicle's motion, which is then used to calculate (or estimate), by integration calculation, the vehicle's speed and the vehicle's current position.

A suffix "i" in the above equations (44) to (46) represents the number of repeat of the Newton Raphson calculation. That is, the right side of the above equation (44), or $(fx_i)i$, is expressed as follows:

$$(f_{x1})_i = f_{x1}((\phi')_i, (\theta')_i, (\phi')_i, (OFx)_i, (OFy)_i, (OFz)_i) \quad (47)$$

For example, "$\partial(fx_1)i/\partial(\phi')i$" in the left element of the left side of the equation (44) is equivalent to the result of replacing "$\partial fx_1/\partial\phi$" with "$(\phi')i, (\theta')i, (\phi')i, (OFx)i, (OFy)i,$ and $(OFz)i$".

In addition, the suffix of "$fx_1$" indicates the number of seconds during which the process continues, for example for 10 seconds. Accordingly, if the process continues for 10 seconds, the left element in the left side of the equation (44) has $fx_1$ to $fx_{10}$, $fy_1$ to $fy_{10}$ and $fz_1$ to $fz_{10}$. In this case, the matrix has 30 (=3×10) lines and 6 columns.

By the way, the answers to the unknowns, obtained from the left side of the equation (45), may slightly deviate from the true answer. In addition, the true answers may change as time advances. Accordingly, in this embodiment, the answers are being continuously calculated, for example for several seconds or several minutes, based on the equation (45) to obtain the average of them as the final result of learning.

(1-7) Autonomic Operation by Three Axis Acceleration Sensor

In a similar way to the above equation (30), the three axis acceleration sensor observation value AD can be represented as follows:

$$\begin{pmatrix} ADx'' \\ ADy'' \\ ADz'' \end{pmatrix} = GE \cdot B^{-1}\left(A^{-1}\begin{pmatrix} 0 \\ 0 \\ -g \end{pmatrix} + \begin{pmatrix} \alpha x \\ \alpha y \\ 0 \end{pmatrix}\right) + OF \quad (48)$$

Classifying the above equation (48) for the acceleration in the direction of the motion $\alpha x$ and the lateral acceleration $\alpha y$ presents:

$$\begin{pmatrix} \alpha x \\ \alpha y \\ 0 \end{pmatrix} = B \cdot GE^{-1}\left\{\begin{pmatrix} ADx'' \\ ADy'' \\ ADz'' \end{pmatrix} - OF\right\} - A^{-1}\begin{pmatrix} 0 \\ 0 \\ -g \end{pmatrix} \quad (49)$$

The transformation matrix B of the above equation (49) is expressed as follows:

$$B = \begin{pmatrix} 1 & 0 & 0 \\ 0 & C_{\phi'} & S_{\phi'} \\ 0 & -S_{\phi'} & C_{\phi'} \end{pmatrix}\begin{pmatrix} C_{\theta'} & 0 & -S_{\theta'} \\ 0 & 1 & 0 \\ S_{\theta'} & 0 & C_{\theta'} \end{pmatrix}\begin{pmatrix} C_{\varphi'} & S_{\varphi'} & 0 \\ -S_{\varphi'} & C_{\varphi'} & 0 \\ 0 & 0 & 1 \end{pmatrix} \quad (50)$$

$$= \begin{pmatrix} C_{\theta'} & 0 & -S_{\theta'} \\ S_{\phi'}S_{\theta'} & C_{\phi'} & S_{\phi'}C_{\theta'} \\ C_{\phi'}S_{\theta'} & -S_{\phi'} & C_{\phi'}C_{\theta'} \end{pmatrix}\begin{pmatrix} C_{\varphi'} & S_{\varphi'} & 0 \\ -S_{\varphi'} & C_{\varphi'} & 0 \\ 0 & 0 & 1 \end{pmatrix}$$

$$= \begin{pmatrix} C_{\theta'}C_{\varphi'} & C_{\theta'}S_{\varphi'} & -S_{\theta'} \\ S_{\phi'}S_{\theta'}C_{\varphi'} - C_{\phi'}S_{\varphi'} & S_{\phi'}S_{\theta'}S_{\varphi'} + C_{\phi'}C_{\varphi'} & S_{\phi'}C_{\theta'} \\ C_{\phi'}S_{\theta'}C_{\varphi'} + S_{\phi'}S_{\varphi'} & C_{\phi'}S_{\theta'}S_{\varphi'} - S_{\phi'}C_{\varphi'} & C_{\phi'}C_{\theta'} \end{pmatrix}$$

The second element in the right side of the above equation (49) is represented as follows:

$$A^{-1}\begin{pmatrix} 0 \\ 0 \\ -g \end{pmatrix} = \begin{pmatrix} C_{\theta} & 0 & S_{\theta} \\ 0 & 1 & 0 \\ -S_{\theta} & 0 & C_{\theta} \end{pmatrix}\begin{pmatrix} 0 \\ 0 \\ -g \end{pmatrix} = \begin{pmatrix} -gS_{\theta} \\ 0 \\ -gC_{\theta} \end{pmatrix} \quad (51)$$

Accordingly, the substitution of the equations (50) and (51) into the above equation (49) presents:

$$\frac{ADx'' - OFx}{GEx}(C_{\theta'}C_{\varphi'}) + \frac{ADy'' - OFy}{GEy}(C_{\theta'}S_{\varphi'}) + \quad (52)$$

$$\frac{ADz'' - OFz}{GEz}(-S_{\theta'}) - (-gS_{\theta}) = \alpha x$$

$$\frac{ADx'' - OFx}{GEx}(S_{\phi'}S_{\theta'}C_{\varphi'} - C_{\phi'}S_{\varphi'}) + \quad (53)$$

$$\frac{ADy'' - OFy}{GEy}(S_{\phi'}S_{\theta'}S_{\varphi'} + C_{\phi'}C_{\varphi'}) +$$

$$\frac{ADz'' - OFz}{GEz}(S_{\phi'}C_{\theta'}) - (gS_{\phi}C_{\theta}) = \alpha y$$

$$\frac{ADx'' - OFx}{GEx}(C_{\phi'}S_{\theta'}C_{\varphi'} + S_{\phi'}S_{\varphi'}) + \quad (54)$$

$$\frac{ADy'' - OFy}{GEy}(S_{\phi'}S_{\theta'}C_{\varphi'} - C_{\phi'}C_{\varphi'}) +$$

$$\frac{ADz'' - OFz}{GEz}(C_{\theta'}C_{\phi'}) - (-gC_{\phi}C_{\theta}) = 0$$

To calculate the acceleration in the direction of the motion $\alpha x$ from the equation (52), the swing angle $\theta$ around the y' axis, indicating the forward or backward inclination of the road, may need to be calculated. This swing angle $\theta$ is represented as follows:

$$S_{\theta} = \sin\theta = \frac{2\Delta H[m]}{(V_i + V_{i-1})[m/s] \cdot 1[sec]} = -\frac{2\Delta H}{V_t + V_{t-1}} \quad (55)$$

wherein $\Delta H$ represents an altitude difference while Vt indicates speed.

What the apparatus finally wants is the speed Vt. Accordingly, the following describes how to obtain the speed Vt without calculating the other unknowns such as the acceleration in the direction of the motion $\alpha x$ and the swing angle $\theta$ indicating the forward or backward inclination of the road.

Here, "$Vt_{-1}$" represents the previous answer of the speed, which is calculated before the final answer of the speed Vt. If the speed Vt is the speed of the vehicle at the time when its car navigation apparatus has just lost the connection with the GPS, the speed $Vt_{-1}$ is equivalent to the speed Vt0, which has been calculated based on the GPS signal before losing the connection.

The known elements of the equation (52) can be collectively represented as $\beta$, and the known elements $\beta$ becomes:

$$\beta = \frac{ADx'' - OFx}{GEx}(C_{\theta'}C_{\varphi'}) + \quad (56)$$

$$\frac{ADy'' - OFy}{GEy}(C_{\theta'}S_{\varphi'}) + \frac{ADz'' - OFz}{GEz}(-S_{\theta'})$$

By using that equation (56), the equation (52) can be transformed into:

$$\alpha x = \beta + gS_{\theta} \quad (57)$$

The correlation between the speed Vt and the acceleration in the direction of the motion αx is represented as follows:

$$V_t = V_{t-1} + \alpha x \quad (58)$$

By substituting the above equations (55) and (57), the equation (58) can be transformed into:

$$V_t = V_{t-1} + \alpha x = V_{t-1} + \beta + gS_\theta = V_{t-1} + \beta - \frac{2g\Delta H}{V_t + V_{t-1}} \quad (59)$$

Classifying the equation (59) for the speed Vt presents:

$$V_t^2 - \beta V_t - V_{t-1}^2 - \beta V_{t-1} + 2g\Delta H = 0 \quad (60)$$

Accordingly, based on the equation (60), the speed Vt is expressed as follows:

$$V_t = \frac{\beta}{2} + \sqrt{\left(\frac{\beta}{2} + V_{t-1}\right)^2 - 2g\Delta H} \quad (61)$$

In that manner, while receiving the GPS signals, the car navigation apparatus has previously learned the following values: the tilt angle φ', the swing angle θ' and the pan angle ψ', each of which indicates the attachment angle of the three axis acceleration sensor with respect to the vehicle; and the zero point offset OFx, OFy and OFz of the three axis acceleration sensor. While not receiving the GPS signals due to the vehicle running behind the buildings or the like, the car navigation apparatus can autonomically calculate (or estimate) the acceleration in the direction of the motion αx based on the three axis acceleration sensor observation values Adx", ADy" and Adz" and the attitude difference ΔH and by using the following learning results: the tilt angle φ', the swing angle θ' and the pan angle ψ', each of which indicates the attachment angle of the three axis acceleration sensor with respect to the vehicle; and the zero point offset OFx, OFy and OFz of the three axis acceleration sensor. Based on the calculated acceleration αx, the vehicle's speed (also referred to as "autonomic speed") Vt is calculated.

In addition, based on the autonomic speed Vt, the current position of the vehicle can be calculated by integration calculation, even when the vehicle is running inside tunnels and not receiving any GPS signals. This enables the car navigation apparatus to continuously display the current position on a screen.

(1-8) Two Axis Acceleration Sensor Observation Value

The above car navigation apparatus is equipped with the three axis acceleration sensor, which allows the navigation apparatus to calculate (or estimate) the vehicle's autonomic speed Vt and the current position even while not receiving any GPS signals. Alternatively, the car navigation apparatus may be equipped with a two axis acceleration sensor, which also allows the navigation apparatus to calculate (or estimate) the vehicle's autonomic speed Vt and the current position. In this case, the two axis acceleration sensor may be placed so as to detect the acceleration in the forward or backward direction and in the lateral direction.

In reality, in a similar way to the above equation (30) for the three axis acceleration sensor observation value AD, while receiving the GPS signals, the two axis acceleration sensor observation value $AD_B$, when a zero point offset $OF_B$ and a gain $GE_B$ are taken into consideration, can be expressed as follows:

$$\begin{pmatrix} AD_B x'' \\ AD_B y'' \end{pmatrix} = GE_B \begin{pmatrix} 1 & 0 & 0 \\ 0 & 1 & 0 \end{pmatrix} B^{-1} \left( A^{-1} \begin{pmatrix} 0 \\ 0 \\ -g \end{pmatrix} + \begin{pmatrix} \alpha x \\ \alpha y \\ 0 \end{pmatrix} \right) + OF_B \quad (62)$$

As noted above, the transformation matrix A is expressed by the equation (5) while the transformation matrix B is expressed by the equation (11). Accordingly, the inverse matrix $A^{-1}$ of the transformation matrix A becomes:

$$A^{-1} = \begin{pmatrix} \cos\theta & 0 & \sin\theta \\ 0 & 1 & 0 \\ -\sin\theta & 0 & \cos\theta \end{pmatrix} = \begin{pmatrix} C_\theta & 0 & S_\theta \\ 0 & 1 & 0 \\ -S_\theta & 0 & C_\theta \end{pmatrix} \quad (63)$$

Moreover, the inverse matrix $B^{-1}$ of the transformation matrix B is expressed as follows:

$$B^{-1} = \begin{pmatrix} \cos\varphi' & -\sin\varphi' & 0 \\ \sin\varphi' & \cos\varphi' & 0 \\ 0 & 0 & 1 \end{pmatrix} \begin{pmatrix} \cos\theta' & 0 & \sin\theta' \\ 0 & 1 & 0 \\ -\sin\theta' & 0 & \cos\theta' \end{pmatrix} \begin{pmatrix} 1 & 0 & 0 \\ 0 & \cos\phi' & -\sin\phi' \\ 0 & \sin\phi' & \cos\phi' \end{pmatrix} \quad (64)$$

$$= \begin{pmatrix} C_{\varphi'} C_{\theta'} & -S_{\varphi'} C_{\phi'} + C_{\varphi'} S_{\theta'} S_{\phi'} & S_{\varphi'} S_{\phi'} + C_{\varphi'} S_{\theta'} C_{\phi'} \\ S_{\varphi'} C_{\theta'} & C_{\varphi'} C_{\phi'} + S_{\varphi'} S_{\theta'} S_{\phi'} & -C_{\varphi'} S_{\phi'} + S_{\varphi'} S_{\theta'} C_{\phi'} \\ -S_{\theta'} & C_{\theta'} S_{\phi'} & C_{\theta'} C_{\phi'} \end{pmatrix}$$

The gain $GE_B$ of the two axis acceleration sensor is:

$$GE_B = \begin{pmatrix} GE_B x & 0 \\ 0 & GE_B y \end{pmatrix} \quad (65)$$

On the other hand, the zero point offset $OF_B$ is:

$$OF_B = \begin{pmatrix} OF_B x \\ OF_B y \end{pmatrix} \quad (66)$$

In that case, out of the elements of the above equation (62), the following values are unknown: the gain $GE_{Bx}$ and $GE_{By}$, the zero point offset $OF_{Bx}$ and $OF_{By}$, the tilt angle φ', swing angle θ' and pan angle ψ' of the two axis acceleration sensor attached to the vehicle, the swing angle θ representing the forward or backward inclination of the road and the tilt angle φ representing the lateral inclination of the road. However, the gain $GE_{Bx}$ and $GE_{By}$ can be determined from the specifics of the two axis acceleration sensor or by measuring the actual values. The swing angle θ representing the forward or backward inclination of the road can be calculated from the altitude information detected by an air pressure sensor, which is installed in the monitor-integrated-type body of the car navigation apparatus. On the other hand, the tilt angle φ representing the lateral inclination of the road may be set at zero although this may cause some errors.

The other values, such as the gravity acceleration g, can be calculated: The GPS signal is acquired from the GPS satellite to calculate the latitude of the current position and then the gravity acceleration g may be figured out from a latitude-gravity acceleration conversion table in which the degrees of latitude are associated with the values of the gravity acceleration.

In addition, the acceleration in the direction of the vehicle's motion αx may be calculated as a reference based on the vehicle's speed, which is calculated from the GPS signals. Moreover, the lateral acceleration αy of the vehicle can be also calculated as a reference based on the direction the vehicle headed for and the vehicle's speed, which are calculated from the GPS signals.

As a result, as for the above equation (62), the still unknown numbers are: the zero point offset $GE_{Bx}$ and $GE_{By}$ of the two axis acceleration sensor; and the tilt angle φ', the swing angle θ' and the pan angle ψ', each of which indicates the attachment angle of the two axis acceleration sensor with respect to the vehicle. Those five numbers will be calculated.

(1-9) Learning of Two Axis Acceleration Sensor's Attachment Angle and Zero Point Offset $$\begin{pmatrix} AD_Bx'' \\ AD_By'' \end{pmatrix} = \begin{pmatrix} GE_Bx & 0 \\ 0 & GE_By \end{pmatrix} \begin{pmatrix} 1 & 0 & 0 \\ 0 & 1 & 0 \end{pmatrix} \quad (69)$$

$$\begin{pmatrix} C_{\varphi'}C_{\theta'} & -S_{\varphi'}C_{\phi'} + C_{\varphi'}S_{\theta'}S_{\phi'} & S_{\varphi'}S_{\phi'} + C_{\varphi'}S_{\theta'}C_{\phi'} \\ S_{\varphi'}C_{\theta'} & C_{\varphi'}C_{\phi'} + S_{\varphi'}S_{\theta'}S_{\phi'} & -C_{\varphi'}S_{\phi'} + S_{\varphi'}S_{\theta'}C_{\phi'} \\ -S_{\theta'} & C_{\theta'}S_{\phi'} & C_{\theta'}C_{\phi'} \end{pmatrix}$$

$$\begin{pmatrix} Ex \\ Ey \\ Ez \end{pmatrix} + \begin{pmatrix} OF_Bx \\ OF_By \end{pmatrix}$$

$$= \begin{pmatrix} GE_Bx\{Ex(C_{\varphi'}C_{\theta'}) + Ey(-S_{\varphi'}C_{\phi'} + C_{\varphi'}S_{\theta'}S_{\phi'}) + Ez(S_{\varphi'}S_{\phi'} + C_{\varphi'}S_{\theta'}C_{\phi'})\} + OF_Bx \\ GE_By\{Ex(S_{\varphi'}C_{\theta'}) + Ey(C_{\varphi'}C_{\phi'} + S_{\varphi'}S_{\theta'}S_{\phi'}) + Ez(-C_{\varphi'}S_{\phi'} + S_{\varphi'}S_{\theta'}C_{\phi'})\} + OF_By \end{pmatrix}$$

$$= \begin{pmatrix} GE_Bx\{(-S_{\theta}g + \alpha x)(C_{\varphi'}C_{\theta'}) + (\alpha y)(-S_{\varphi'}C_{\phi'} + C_{\varphi'}S_{\theta'}S_{\phi'}) + (-C_{\theta}g)(S_{\varphi'}S_{\phi'} + C_{\varphi'}S_{\theta'}C_{\phi'})\} + OF_Bx \\ GE_By\{(-S_{\theta}g + \alpha x)(S_{\varphi'}C_{\theta'}) + (\alpha y)(C_{\varphi'}C_{\phi'} + S_{\varphi'}S_{\theta'}S_{\phi'}) + (-C_{\theta}g)(-C_{\varphi'}S_{\phi'} + S_{\varphi'}S_{\theta'}C_{\phi'})\} + OF_By \end{pmatrix}$$

Here, the two axis acceleration sensor observation value $AD_B$ is regarded as "$I_B$" while the zero point offset $OF_B$ and the gain $GE_B$ of the two axis acceleration sensor is taken into consideration. Moreover, by using parts of the above equation (62) which is the same as the equation (34), the above "$I_B$" becomes:

$$I_B = GE_B \begin{pmatrix} 1 & 0 & 0 \\ 0 & 1 & 0 \end{pmatrix} B^{-1}E + OF_B \quad (67)$$

The inverse matrix $A^{-1}$ of the transformation matrix A in the above equation (34) represents the forward or backward inclination of the road with respect to the flat ground surface: This can be obtained based on the altitude information, which is acquired from the result (atmospheric pressure) of the barometer. In addition, the gravity acceleration g, the acceleration in the direction of the motion αx and the lateral acceleration αy can be calculated as references, as noted above. Accordingly, "E" in the above equation (67) is already known.

By using the inverse matrix $A^{-1}$ of the transformation matrix A as indicated by the above equation (63), the known "E" can be transformed in the following manner:

$$\begin{pmatrix} Ex \\ Ey \\ Ez \end{pmatrix} = A^{-1} \begin{pmatrix} 0 \\ 0 \\ -g \end{pmatrix} + \begin{pmatrix} \alpha x \\ \alpha y \\ 0 \end{pmatrix} \quad (68)$$

-continued $$= \begin{pmatrix} C_{\theta} & 0 & S_{\theta} \\ 0 & 1 & 0 \\ -S_{\theta} & 0 & C_{\theta} \end{pmatrix} \begin{pmatrix} 0 \\ 0 \\ -g \end{pmatrix} + \begin{pmatrix} \alpha x \\ \alpha y \\ 0 \end{pmatrix}$$

$$= \begin{pmatrix} -S_{\theta}g + \alpha x \\ \alpha y \\ -C_{\theta}g \end{pmatrix}$$

In the above equation (67), the unknowns are: the tilt angle φ', the swing angle θ' and the pan angle ψ', each of which indicates the attachment angle of the two axis acceleration sensor with respect to the vehicle; and the zero point offset $GE_B$ of the two axis acceleration sensor. The "$I_B$", or the two axis acceleration sensor observation value $AD_B$ can be transformed into:

The above equation (69) is transformed into two function expressions fx and fy for the Newton-Raphson Method as follows:

$$f_x(\varphi',\theta',\phi',OF_Bx,OF_By) = AD_Bx'' - GE_Bx\{(-S_{\theta}g+\alpha x) \\ (C_{\phi'}C_{\theta'}) + (\alpha y)(-S_{\phi'}C_{\phi'}+C_{\phi'}S_{\theta'}S_{\phi'}) + (-C_{\theta}g)(S_{\phi'}S_{\theta'}+ \\ C_{\phi'}S_{\theta'}C_{\phi'})\} - OF_Bx = 0 \quad (70)$$

$$f_y(\varphi',\theta',\phi',OF_Bx,OF_By) = AD_By'' - GE_By\{(-S_{\theta}g+\alpha x) \\ (S_{\phi'}C_{\theta'}) + (\alpha y)(C_{\phi'}C_{\theta'}+S_{\phi'}S_{\theta'}S_{\phi'}) + (-C_{\theta}g)(-C_{\phi'}S_{\theta'}+ \\ S_{\phi'}S_{\theta'}C_{\phi'})\} - OF_By = 0 \quad (71)$$

As for those two function formulas fx and fy, there are totally five unknown numbers (the zero point offset $GE_{Bx}$ and $GE_{By}$ of the two axis acceleration sensor, and the tilt angle φ', swing angle θ' and pan angle ψ' each of which represents the attachment angle of the two axis acceleration sensor with respect to the vehicle) in the above equations (70) to (71). This means those equations may not be able to be solved. Therefore, the apparatus waits for at least three seconds to acquire six different function formulas fx1 to fx3 and fy1 to fy3 in order for these formulas to outnumber the unknown values.

By the way, the known values in the equations (70) and (71) vary according to the GPS signals, which are acquired every second. Accordingly, at least three seconds later, six different function formulas fx1 to fx3 and fy1 to fy3 may be obtained as a result of change of the known values. However, various function formulas may not be obtained unless the vehicle's speed changes. Therefore, various function formulas fx1 of fxt and fy1 to fyt have been acquired for ten seconds during which the vehicle's speed may change.

In that case, the number of the function formulas (fx1 to fxt and fy1 to fyt) are larger than the number of the unknown values (i.e. 5). Accordingly, the least squares method is used to obtain values which may satisfy the unknowns of the function formulas (fx1 to fxt and fy1 to fyt).

Considering the multidimensional Newton Raphson method, a variation δ in the one-dimensional Newton Raphson method is expressed as the above equation (41). In the Newton Raphson method, when the variation δ becomes less or equal to a predetermined convergence threshold the true answers for the unknowns are considered to have been acquired.

Transforming the above equation (41) presents the equation (42) as noted above. Considering N dimension, this equation (42) can be also expressed as the equation (43).

Accordingly, in this case, the following equation is repeatedly calculated:

$$\begin{pmatrix} \frac{\partial (f_{x1})_i}{\partial (\varphi')_i} & \frac{\partial (f_{x1})_i}{\partial (\theta')_i} & \frac{\partial (f_{x1})_i}{\partial (\phi')_i} & \frac{\partial (f_{x1})_i}{\partial (OF_Bx)_i} & \frac{\partial (f_{x1})_i}{\partial (OF_By)_i} \\ \frac{\partial (f_{y1})_i}{\partial (\varphi')_i} & \frac{\partial (f_{y1})_i}{\partial (\theta')_i} & \frac{\partial (f_{y1})_i}{\partial (\phi')_i} & \frac{\partial (f_{y1})_i}{\partial (OF_Bx)_i} & \frac{\partial (f_{y1})_i}{\partial (OF_By)_i} \\ \frac{\partial (f_{x2})_i}{\partial (\varphi')_i} & \frac{\partial (f_{x2})_i}{\partial (\theta')_i} & \frac{\partial (f_{x2})_i}{\partial (\phi')_i} & \frac{\partial (f_{x2})_i}{\partial (OF_Bx)_i} & \frac{\partial (f_{x2})_i}{\partial (OF_By)_i} \\ \frac{\partial (f_{y2})_i}{\partial (\varphi')_i} & \frac{\partial (f_{y2})_i}{\partial (\theta')_i} & \frac{\partial (f_{y2})_i}{\partial (\phi')_i} & \frac{\partial (f_{y2})_i}{\partial (OF_Bx)_i} & \frac{\partial (f_{y2})_i}{\partial (OF_By)_i} \\ \vdots & \vdots & \vdots & \vdots & \vdots \end{pmatrix} \begin{pmatrix} (\delta\varphi')_i \\ (\delta\theta')_i \\ (\delta\phi')_i \\ (\delta OF_Bx)_i \\ (\delta OF_By)_i \end{pmatrix} = -\begin{pmatrix} (f_{x1})_i \\ (f_{y1})_i \\ (f_{x2})_i \\ (f_{y2})_i \\ \vdots \end{pmatrix} \quad (72)$$

To acquire the variation δ or the right element in the left side of the equation (72), the left element (partial derivatives) in the left side of the above equation (72) and its right side (function formulas) are calculated.

By using the acquired variation δ, the final answers to the unknowns can be obtained as follows:

$$\begin{pmatrix} (\varphi')_{i+1} \\ (\theta')_{i+1} \\ (\phi')_{i+1} \\ (OF_Bx)_{i+1} \\ (OF_By)_{i+1} \end{pmatrix} = \begin{pmatrix} (\varphi')_i \\ (\theta')_i \\ (\phi')_i \\ (OF_Bx)_i \\ (OF_By)_i \end{pmatrix} + \begin{pmatrix} (\delta\varphi')_i \\ (\delta\theta')_i \\ (\delta\phi')_i \\ (\delta OF_Bx)_i \\ (\delta OF_By)_i \end{pmatrix} \quad (73)$$

By the way, the initial values for the first element in the right side of the above equation (73) may become:

$$\begin{pmatrix} (\varphi')_0 \\ (\theta')_0 \\ (\phi')_0 \\ (OF_Bx)_0 \\ (OF_By)_0 \end{pmatrix} = \begin{pmatrix} 0[\text{rad}] \\ 0[\text{rad}] \\ 0[\text{rad}] \\ 2.5[\text{V}] \\ 2.5[\text{V}] \end{pmatrix} \quad (74)$$

As for the initial values for the first element in the right side of the above equation (73), the tilt angle $(\phi')_0$, the swing angle $(\theta')_0$ and the pan angle $(\psi')_0$ are 0 deg. In addition, the zero point offset $(OF_{Bx})_0$ and $(OF_{By})_0$ may be at the voltage of 2.5 v, which indicates that the two axis acceleration sensor is not affected by the acceleration, if the voltage can change within a range of 0 to 5 v in accordance with the acceleration affecting the two axis acceleration sensor.

The left side of the above equation (73) presents the final answer. The first element in the right side of the equation (73) represents the previous answer calculated based on the equation (73). The second element in the right side of the equation (73) represents the above variation δ. Based on the left side of the equation (73), all the unknowns (the zero point offset $GE_{Bx}$ and $GE_{By}$ of the two axis acceleration sensor, and the tilt angle $\phi'$, swing angle $\theta'$ and pan angle $\psi'$ each of which represents the attachment angle of the two axis acceleration sensor with respect to the vehicle) are acquired.

In that manner, the unknowns (the zero point offset $GE_{Bx}$ and $Ge_{By}$ of the two axis acceleration sensor, and the tilt angle $\phi'$, swing angle $\theta'$ and pan angle $\psi'$ each of which represents the attachment angle of the two axis acceleration sensor with respect to the vehicle) are acquired. During the time when the GPS signals are not being received due to the vehicle running into tunnels or the like, the car navigation apparatus estimates, based on the result of the detection by the two axis acceleration sensor, the acceleration in the direction of the motion αx, which is then used to calculate (or estimate), by integration calculation, the vehicle's speed and the vehicle's current position.

A suffix "i" in the above equations (72) to (74) represents the number of repeat of the calculation. That is, the right side of the above equation (72), or $(fx_1)i$, is equivalent to the above equation (47). For example, "$\partial (fx_1)i/\partial (\phi')i$" in the left element of the left side of the equation (72) is equivalent to the result of replacing "$\partial fx_1/\partial \phi$" with "$(\phi')i$, $(\theta')i$, $(\phi')i$, $(OFx)i$, $(OFy)i$ and $(OFz)i$".

In addition, the suffix of "$fx_1$" indicates the number of seconds during which the process continues, for example for 10 seconds. Accordingly, if the process continues for 10 seconds, the first element in the left side of the equation (72) has $fx_1$ to $fx_{10}$ and $fy_1$ to $fy_{10}$.

By the way, the answers to the unknowns, obtained from the left side of the equation (73), may slightly deviate from the true answer. In addition, the true answers may change as time advances. Accordingly, in this embodiment, the answers are being continuously calculated, for example for several seconds or several minutes, based on the equation (73) to obtain the average of them as the final result of learning.

(1-10) Autonomic Operation by Two Axis Acceleration Sensor

By the way, based on the equation (62), the two axis acceleration sensor observation value $AD_B$ is represented as follows:

$$\begin{pmatrix} AD_Bx'' \\ AD_By'' \end{pmatrix} = \begin{pmatrix} GE_Bx & 0 \\ 0 & GE_By \end{pmatrix} \quad (75)$$

$$\begin{pmatrix} 1 & 0 & 0 \\ 0 & 1 & 0 \end{pmatrix} B^{-1} \left\{ A^{-1} \begin{pmatrix} 0 \\ 0 \\ -g \end{pmatrix} + \begin{pmatrix} \alpha x \\ \alpha y \\ 0 \end{pmatrix} \right\} + \begin{pmatrix} OF_Bx \\ OF_By \end{pmatrix}$$

To solve for the acceleration in the direction of the motion αx, transforming the equation (75) presents:

$$\begin{pmatrix} \dfrac{AD_Bx'' - OF_Bx}{GE_Bx} \\ \dfrac{AD_By'' - OF_By}{GE_By} \end{pmatrix} = \begin{pmatrix} 1 & 0 & 0 \\ 0 & 1 & 0 \end{pmatrix} B^{-1} \left\{ A^{-1} \begin{pmatrix} 0 \\ 0 \\ -g \end{pmatrix} + \begin{pmatrix} \alpha x \\ \alpha y \\ 0 \end{pmatrix} \right\} \quad (76)$$

By using "z" representing a z axis which the two axis acceleration sensor does not support, the equation (76) can be expressed as follows:

$$\begin{pmatrix} \dfrac{AD_Bx'' - OF_Bx}{GE_Bx} \\ \dfrac{AD_By'' - OF_By}{GE_By} \\ z \end{pmatrix} = B^{-1} \left\{ A^{-1} \begin{pmatrix} 0 \\ 0 \\ -g \end{pmatrix} + \begin{pmatrix} \alpha x \\ \alpha y \\ 0 \end{pmatrix} \right\} \quad (77)$$

In the equation (77), the following values are already known: the inverse matrix $A^{-1}$ of the transformation matrix A; the gain $GE_{Bx}$ and $GE_{By}$ of the two axis acceleration sensor; the inverse matrix $B^{-1}$ of the transformation matrix B; the offset $OF_{Bx}$ and $OF_{By}$ of the two axis acceleration sensor; the two axis acceleration sensor observation value $AD_{Bx}''$ and $AD_{By}''$; and the gravity acceleration g. The still unknowns are the acceleration in the direction of the motion αx and the lateral acceleration αy. The equation (77) is transformed into:

$$B \begin{pmatrix} \dfrac{AD_Bx'' - OF_Bx}{GE_Bx} \\ \dfrac{AD_By'' - OF_By}{GE_By} \\ z \end{pmatrix} - A^{-1} \begin{pmatrix} 0 \\ 0 \\ -g \end{pmatrix} = \begin{pmatrix} \alpha x \\ \alpha y \\ 0 \end{pmatrix} \quad (78)$$

The substitution of the equations (50) and (51) into the equation (78) presents:

$$\dfrac{AD_Bx'' - OF_Bx}{GE_Bx}(C_{\theta'}C_{\phi'}) + \quad (79)$$

$$\dfrac{AD_By'' - OF_By}{GE_By}(C_{\theta'}S_{\psi'}) + z(-S_{\theta'}) - (-gS_{\theta}) = \alpha x$$

$$\dfrac{AD_Bx'' - OF_Bx}{GE_Bx}(S_{\phi'}S_{\theta'}C_{\psi'} - C_{\phi'}S_{\psi'}) + \quad (80)$$

$$\dfrac{AD_By'' - OF_By}{GE_By}(S_{\phi'}S_{\theta'}S_{\psi'} + C_{\phi'}C_{\psi'}) +$$

$$z(S_{\phi'}C_{\psi'}) - (gS_{\phi}C_{\theta}) = \alpha y$$

$$\dfrac{AD_Bx'' - OF_Bx}{GE_Bx}(C_{\psi'}S_{\theta'}C_{\phi'} + S_{\psi'}S_{\phi'}) + \quad (81)$$

$$\dfrac{AD_By'' - OF_By}{GE_By}(S_{\psi'}S_{\theta'}C_{\phi'} - C_{\psi'}S_{\phi'}) +$$

$$z(C_{\theta'}C_{\phi'}) - (-gC_{\phi}C_{\theta}) = 0$$

Based on the equation (81), "z" is represented as follows:

$$z = \quad (82)$$

$$\dfrac{1}{C_{\phi'}C_{\theta'}} \left\{ -gC_{\phi}C_{\theta} - \dfrac{AD_Bx'' - OF_Bx}{GE_Bx}(C_{\psi'}S_{\theta'}C_{\phi'} + S_{\psi'}S_{\phi'}) - \right.$$

$$\left. \dfrac{AD_By'' - OF_By}{GE_By}(S_{\psi'}S_{\theta'}C_{\phi'} - C_{\psi'}S_{\phi'}) \right\}$$

Before estimating the acceleration in the direction of the motion αx from the above equation (79), the swing angle θ around the y' axis, representing the forward or backward inclination of the road, is calculated. The swing angle θ can be expressed by the above equation (55) with the altitude difference ΔH and the speed Vt.

What the apparatus finally wants is the autonomic speed Vt. Accordingly, the following describes how to obtain the autonomic speed Vt without calculating the other unknowns such as the acceleration in the direction of the motion αx and the swing angle θ representing the forward or backward inclination of the road.

Here, "$Vt_{-1}$" represents the previous answer of the speed, which is calculated before the final answer of the speed Vt. If the speed Vt is the speed of the vehicle at the time when its car navigation apparatus has just lost the connection with the GPS, the speed $Vt_{-1}$ is equivalent to the speed Vt0, which has been calculated based on the GPS signal before losing the connection.

The known elements of the equation (79) can be collectively represented as β, and the known elements β is expressed by the equation (56) as noted above. By using that equation (56), the equation (79) can be transformed into the above equation (57).

The correlation between the autonomic speed Vt and the acceleration in the direction of the motion αx is represented by the above equation (58). By substituting the above equations (55) and (57), the equation (58) can be transformed into the equation (59) as noted above.

classifying the equation (59) for the autonomic speed Vt presents the equation (60) as noted above. To solve the equation (60) for the autonomic speed Vt, the autonomic speed Vt is expressed by the above equation (61).

In that manner, while receiving the GPS signals, the car navigation apparatus has previously learned the following values: the tilt angle φ', the swing angle θ' and the pan angle ψ', each of which indicates the attachment angle of the two axis acceleration sensor with respect to the vehicle; and the zero point offset $OF_{Bx}$ and $OF_{By}$ of the two axis acceleration sensor. While not receiving the GPS signals due to the vehicle running behind the buildings or the like, the car navigation apparatus can autonomically calculate (or estimate) the acceleration in the direction of the motion αx based on the two axis acceleration sensor observation values $AD_{Bx}''$ and $AD_{Bx}''$ and the attitude difference ΔH and by using the following learning results: the tilt angle φ', the swing angle θ' and the pan angle ψ', each of which indicates the attachment angle of the two axis acceleration sensor with respect to the vehicle; and the zero point offset $OF_{Bx}$ and $OF_{By}$ of the two axis acceleration sensor. Based on the calculated acceleration αx, the vehicle's autonomic speed Vt is calculated.

In addition, based on the autonomic speed Vt, the current position of the vehicle can be calculated by integration calculation, even when the vehicle is running inside tunnels and not receiving any GPS signals. This enables the car navigation apparatus to continuously display the current position on a screen.

(2) Configuration of Car Navigation Apparatus

In line with the basic principle described in the above chapter (1), the car navigation apparatus according to an embodiment of the present invention is designed. A GPS operating mode (learning mode) and a GPS non-operating mode (autonomic mode) of the car navigation apparatus will be described.

(2-1) Configuration of Car Navigation Apparatus for GPS Operating Mode (Learning Mode)

Figure 5:
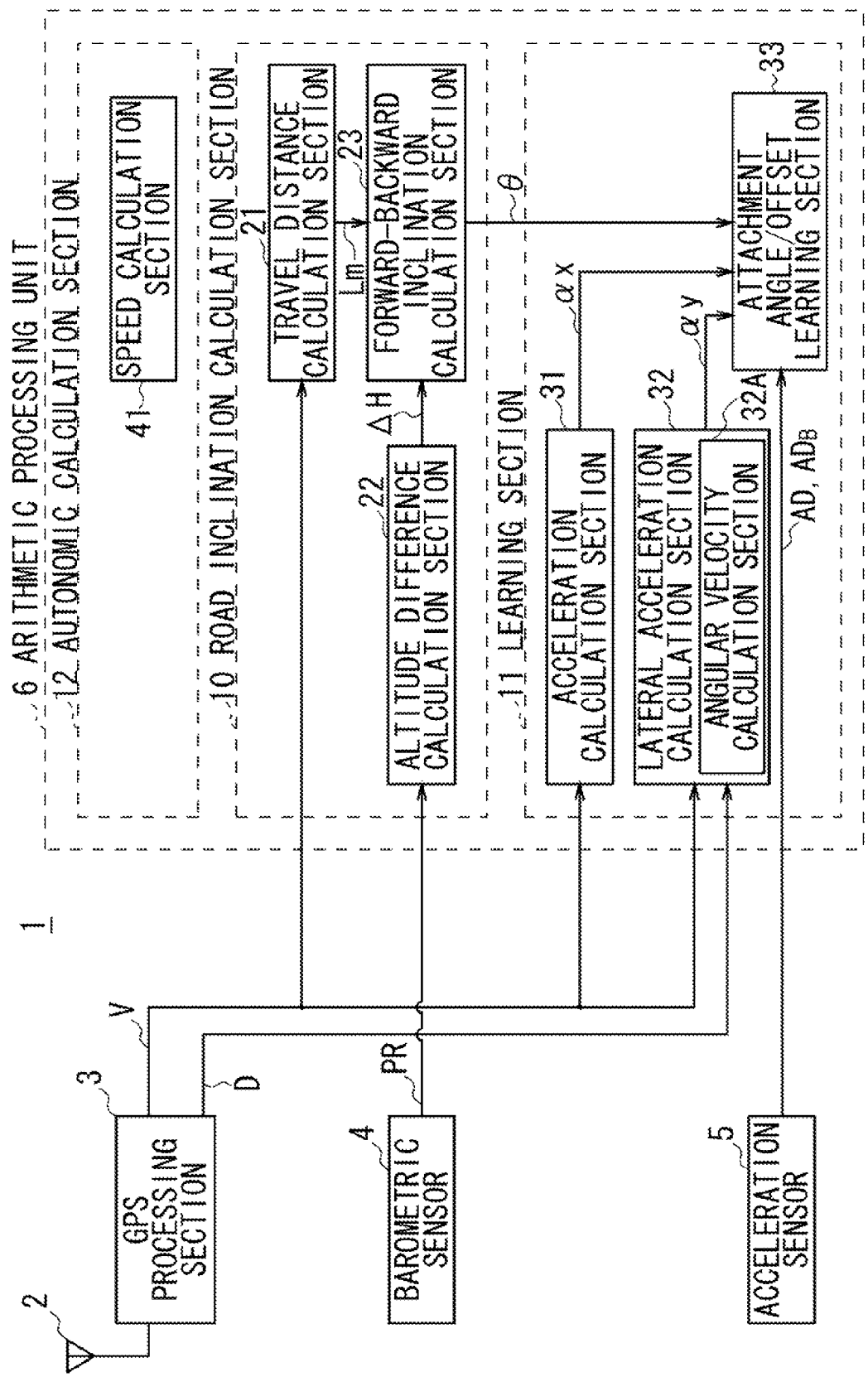
FIG. 5 is a schematic block diagram illustrating the configuration of a car navigation apparatus in a GPS operating mode (learning mode)

FIG. 5 illustrates the configuration of the car navigation apparatus 1, which is mounted on the vehicle or a mobile object. The car navigation apparatus 1 includes a GPS processing section 3, a barometric sensor 4, a two or three axis acceleration sensor 5 and an arithmetic processing unit 6 (equivalent to Central Processing Unit (CPU)).

The arithmetic processing unit 6 reads out from a Read Only Memory (ROM) (not shown) various programs, such as a basic program and a navigation information calculation program, which are then loaded onto a Random Access Memory (RAM). In this manner, the arithmetic processing unit 6 executes those programs to offer various software functions, such as a road inclination calculation section 10, a learning section 11 and an autonomic calculation section 12.

Alternatively, the car navigation apparatus 1 may be equipped with hardware components that offer the functions of the road inclination calculation section 10, learning section 11 and autonomic calculation section 12 of the arithmetic processing unit 6.

The car navigation apparatus 1 receives from a plurality of GPS satellites the GPS signals thorough a GPS antenna 2. Based on the GPS signals, the GPS processing section 3 calculates the vehicle's speed V and direction data D, which are then supplied to the road inclination calculation section 10 and the learning section 11 of the arithmetic processing unit 6.

In the car navigation apparatus 1, the barometric sensor 4 detects atmospheric pressure to supply an atmospheric pressure value PR to the road inclination calculation section 10 of the arithmetic processing unit 6. On the other hand, the acceleration sensor 5 detects various values as the three or two axis acceleration sensor observation value AD or $AD_6$, which are then supplied to the learning section 11 of the arithmetic processing unit 6.

A travel distance calculation section 21 of the road inclination calculation section 10 calculates, based on the speed or velocity V being supplied from the GPS processing section 3, a travel distance Lm of the vehicle, which is then supplied to a forward-backward inclination calculation section 23.

The altitude difference calculation section 22 of the road inclination calculation section 10 has previously memorized an atmospheric pressure/altitude table TBL in which the values of the general atmospheric pressure are associated with the values of altitude. Based on an atmospheric pressure value PR0, which is detected at a time instant t0, and an atmospheric pressure value PR1, which is detected at a time instant t1, the altitude difference calculation section 22 reads out from the atmospheric pressure/altitude table TBL altitude data h0 and h1 corresponding to the atmospheric pressure values PR0 and PR1.

The altitude difference calculation section 22 then calculates an altitude difference ΔH by calculating the difference between the vehicle's altitude data h0 (corresponding to the atmospheric pressure value PR0) and the vehicle's altitude data h1 (corresponding to the atmospheric pressure value PR1). The altitude difference calculation section 22 supplies the calculated altitude difference ΔH to the forward-backward inclination calculation section 23.

Based on the travel distance Lm supplied from the travel distance calculation section 21 and the altitude difference ΔH supplied from the altitude difference calculation section 22, the forward-backward inclination calculation section 23 calculates the swing angle θ indicating the forward or backward inclination of the road in the vehicle coordinate system (with x', y' and z' axes), which is then supplied to an attachment angle/offset learning section 33 of the learning section 11.

An acceleration calculation section 31 of the learning section 11 calculates the acceleration in the direction of the vehicle's motion αx as a reference by differentiating the speed V supplied from the GPS processing section 3. The acceleration calculation section 31 supplies the calculated acceleration αx to the attachment angle/offset learning section 33.

An angular velocity calculation section 32A of a lateral acceleration calculation section 32 of the learning section 11 calculates an angular velocity dD, which represents the changing direction of the vehicle, by differentiating the direction data D supplied from the GPS processing section 3. Based on the speed V supplied from the GPS processing section 3 and the angular velocity dD, the lateral acceleration αy as reference, which is then supplied to the attachment angle/offset learning section 33.

Based on the three or two axis acceleration sensor observation value AD or $AD_B$ supplied from the acceleration sensor 5, the acceleration in the direction of the motion αx supplied from the acceleration calculation section 31 and the lateral acceleration αy supplied from the lateral acceleration calculation section 32, the attachment angle/offset learning section 33 learns the following values by using the methods described in the chapter (1-6) and (1-9): the zero point offset OFxz, OFy and OFz or $OF_{BX}$ and $OF_{BY}$ of the acceleration sensor 5; and the tilt angle φ', the swing angle θ' and the pan angle ψ', each of which represents the attachment angle of the acceleration sensor 5 with respect to the vehicle.

Figure 6:
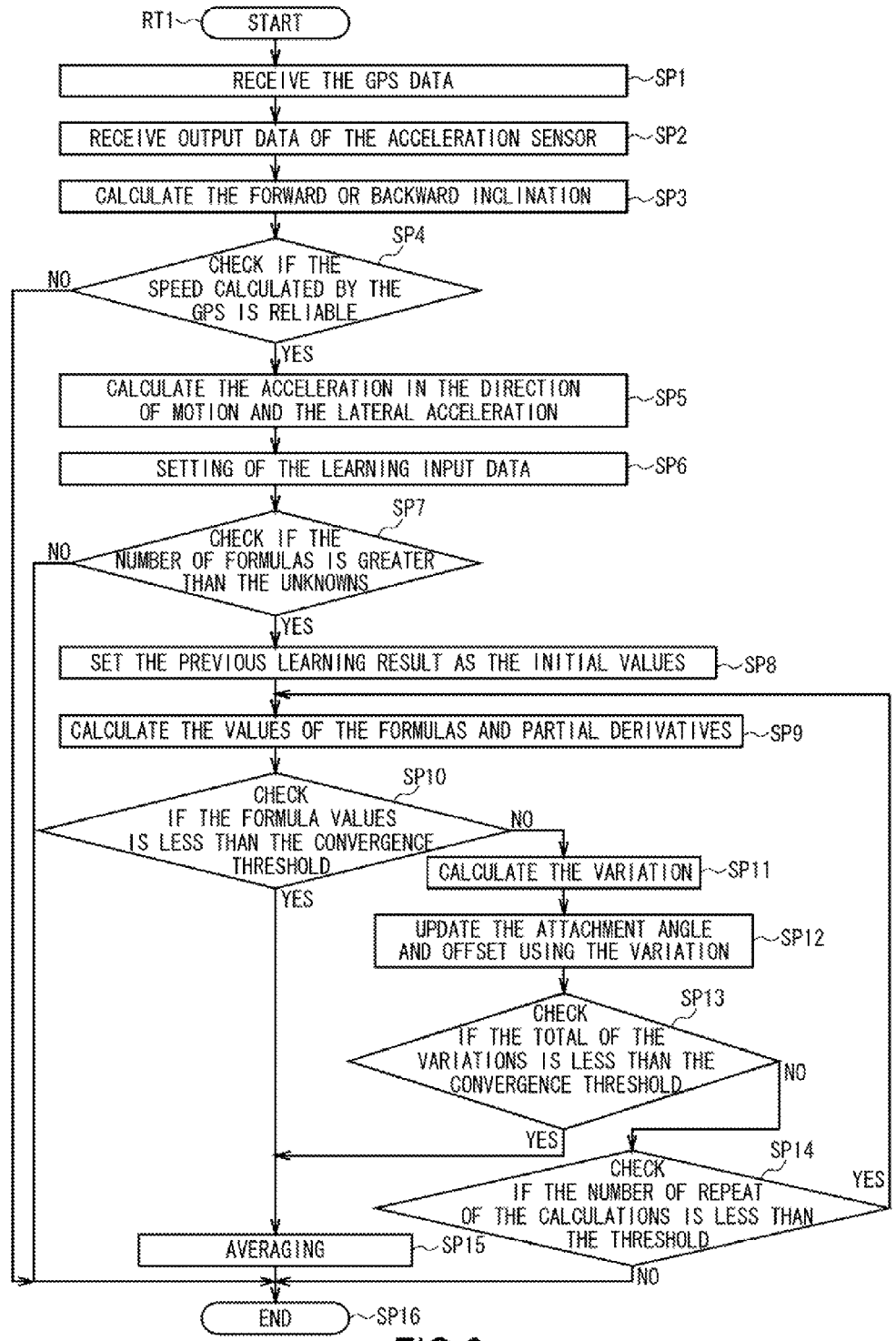
FIG. 6 is a flowchart illustrating a procedure of a learning process, performed while GPS signals are being received.

FIG. 6 illustrates a procedure of the learning process by the car navigation apparatus 1 operating in the GPS operating mode. The car navigation apparatus 1 starts the procedure from a start step of a routine RT1, and then proceeds to step SP1. At step SP1 in the car navigation apparatus 1, the learning section 11 receives from the GPS processing section 3 GPS data including the speed V and direction data D, which were calculated based on the GPS signals from the GPS satellites. The car navigation apparatus 1 subsequently proceeds to step SP2.

At step SP2, in the car navigation apparatus 1, the attachment angle/offset learning section 33 of the learning section 11 receives the three or two axis acceleration sensor observation value AD or $AD_B$ from the acceleration sensor 5, and then proceeds to step SP3.

At step SP3, in the car navigation apparatus 1, based on the travel distance Lm calculated by the travel distance calculation section 21 of the road inclination calculation section 10 and the altitude difference ΔH calculated by the altitude difference calculation section 22, the forward-backward inclination calculation section 23 calculates the swing angle θ indicating the forward or backward inclination of the road in the vehicle coordinate system (with x', y' and z' axes), and then proceeds to step SP4.

At step SP4, the car navigation apparatus 1 checks if the speed information V, obtained at step SP1, is reliable or not, based on a flag attached to the speed information V. If the car navigation apparatus 1 determines that it is unreliable, the car navigation apparatus 1 proceeds to step SP16 to end the process.

Whereas if the car navigation apparatus 1 determines that it is reliable, the car navigation apparatus 1 proceeds to step SP5. At step SP5, the acceleration calculation section 31 calculates, based on the speed V supplied from the GPS processing section 3, the acceleration in the direction of the motion αx as a reference while the lateral acceleration calculation section 32 calculates, based on the speed V supplied from the GPS processing section 3 and the angular velocity dD, the lateral acceleration αy as a reference. The car navigation apparatus 1 subsequently proceeds to step SP6.

At step SP6, the car navigation apparatus 1 sets the following values as learning input data: the three axis acceleration sensor observation value AD and the known value E of the above equation (36), or the two axis acceleration sensor observation value $AD_B$ and the known value E of the above equation (68). The car navigation apparatus 1 subsequently proceeds to step SP7.

At step SP7, the car navigation apparatus 1 compares the number of the unknown values with the number of the function formulas that are used to calculate the zero point offset OFx, OFy and OFz or $OF_{BX}$ and $OF_{BY}$ of the acceleration sensor 5 and the tilt angle φ', swing angle θ' and pan angle ψ' representing the attachment angle of the acceleration sensor 5 with respect to the vehicle, in order to check if the function formulas outnumber the unknown values.

If the number of the function formulas is less than the number of the unknown values, then this means the unknown numbers may not be able to be calculated. In this case, the car navigation apparatus 1 proceeds to step SP16 to end the process.

Whereas if the number of the function formulas is greater than the number of the unknown values, then this means the unknown numbers can be calculated. In this case, the car navigation apparatus 1 proceeds to step SP8.

At step SP8, the car navigation apparatus 1 sets the previous learning result, calculated by the routine RT1, into the left element in the left side of the above equation (44) or (72) as initial values: The previous learning result includes the zero point offset OFx, OFy and OFz or $OF_{BX}$ and $OF_{BY}$ of the acceleration sensor 5 and the tilt angle φ', swing angle θ' and pan angle ψ' representing the attachment angle of the acceleration sensor 5 with respect to the vehicle. The car navigation apparatus 1 subsequently proceeds to step SP9.

At step SP9, the car navigation apparatus 1 calculates the values (partial derivatives) of the left element in the left side of the above equation (44) or (72) and its right side's values (function values), and then proceeds to step SP10.

At step SP10, the car navigation apparatus 1 check if the total of the values in the right side of the equation (44) or (72) is less than a predetermined convergence threshold. If it determines that the total of the values is less than the predetermined convergence threshold, the car navigation apparatus 1 proceeds to step SP15. If not so, the car navigation apparatus 1 proceeds to step SP11.

At step SP11 the car navigation apparatus 1 calculates the variation δ of the right element in the left side of the equation (44) or (72) based on the partial derivatives and function values calculated at step SP9, since the total of the values in the right side of the equation (44) or (72) is greater or equal to the Newton-Raphson method's convergence threshold. The car navigation apparatus 1 subsequently proceeds to step SP12.

At step SP12, by using the variation δ calculated at step SP11, the car navigation apparatus 1 calculates the final answers, which are equivalent to the left side of the equation (45) or (73): The final answers include the zero point offset OFx, OFy and OFz or $OF_{BX}$ and $OF_{BY}$ of the acceleration sensor 5 and the tilt angle φ', swing angle θ' and pan angle ψ' representing the attachment angle of the acceleration sensor 5 with respect to the vehicle. The car navigation apparatus 1 subsequently proceeds to step SP13.

At step SP13, the car navigation apparatus 1 check if the total of the elements (the variation values δ) of the right element in the left side of the equation (44) or (72) is less than a predetermined convergence threshold. If it determines that the total of the elements is less than a predetermined convergence threshold, the car navigation apparatus 1 proceeds to step SP15. If not so, the car navigation apparatus 1 proceeds to step SP14.

At step SP14, the car navigation apparatus 1 check if the number of repeat of the Newton-Raphson calculation (equivalent to the process of SP9 to SP14) reaches a predetermined repeat threshold. If it determines that the Newton-Raphson calculation has not been repeated more than the predetermined number of times yet (which means it has not reached the predetermined repeat threshold yet), the car navigation apparatus 1 returns to step SP9 to repeat the process. In this case, the car navigation apparatus 1, at step SP9, calculates the values (partial derivatives) of the left element in the left side of the above equation (44) or (72) and its right side's values (function values) based on the previous results of calculation including the zero point offset OFx, OFy and OFz or $OF_{BX}$ and $OF_{BY}$ of the acceleration sensor 5 and the tilt angle φ', swing angle θ' and pan angle ψ' representing the attachment angle of the acceleration sensor 5 with respect to the vehicle.

Whereas if it determines at step SP14 that the Newton-Raphson calculation has been already repeated more than the predetermined number of times, then this means that, at step SP10 or step SP13, the total of the values of the function formulas or the total of the elements (the variation values δ) was not converged despite the fact that the Newton-Raphson calculation has been repeated the predetermined number of times. In this case, the car navigation apparatus 1 proceeds to step SP16 to end the process without trying to solve the unknowns.

At step SP15, the car navigation apparatus 1 calculates the final answers of the last several seconds or the last several minutes from the left side of the equation (45) or (70), and then smoothes the calculated final answers to acquire a value, which can be considered to be a true answer, as the final result of learning. The car navigation apparatus 1 subsequently proceeds to step SP16 to end the process.

Instead of smoothing the final answers at step SP15, the car navigation apparatus 1 may calculate an average of the final answers to reduce calculation load.

(2-2) Configuration of Car Navigation Apparatus for GPS Non-Operating Mode (Autonomic Mode)

Figure 7:
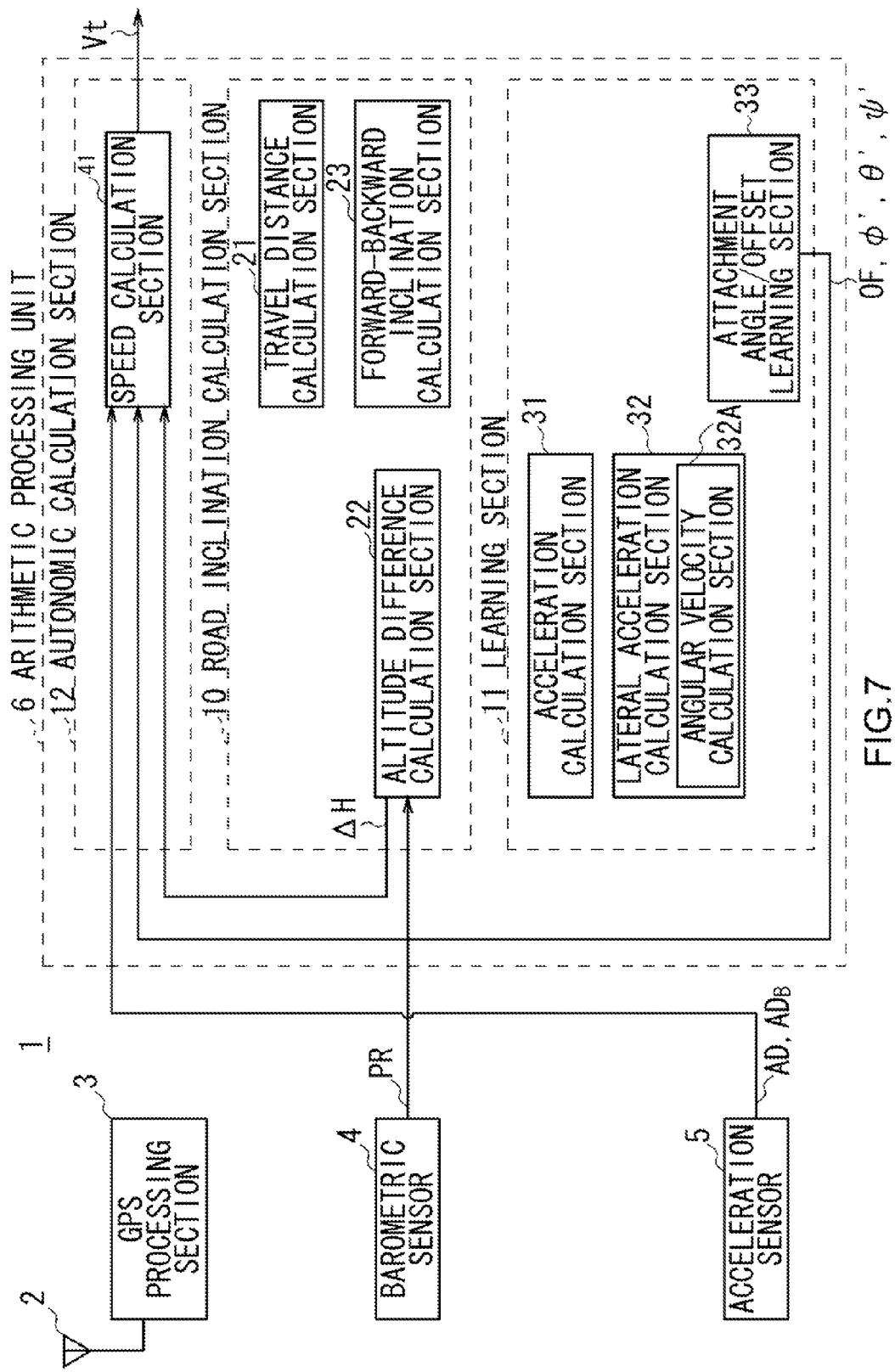
FIG. 7 is a schematic block diagram illustrating the configuration of the car navigation apparatus in a GPS non-operating mode (autonomic mode)

FIG. 7 illustrates the configuration of the car navigation apparatus 1 when not receiving the GPS signals due to the vehicle running inside tunnels or the like. In this case, the GPS processing section 3 does not offer the speed data V and the direction data D. The barometric sensor 4 supplies the atmospheric pressure value PR to the altitude difference calculation section 22 of the road inclination calculation section 10 while the acceleration sensor 5 supplies the three or two axis acceleration sensor observation value AD or $AD_B$ to a speed calculation section 41 of the autonomic calculation section 12.

The altitude difference calculation section 22 of the road inclination calculation section 10 calculates, based on the atmospheric pressure/altitude table TBL, the altitude difference ΔH, which is a difference between the vehicle's altitude at the time instant t0 (associated with the atmospheric pressure value PR0 in the table) and the vehicle's altitude at the time instant t1 (associated with the atmospheric pressure value PR1). The altitude difference calculation section 22 subsequently supplies the calculated altitude difference ΔH to the speed calculation section 41 of the autonomic calculation section 12.

On the other hand, the attachment angle/offset learning section 33 of the learning section 11 supplies what it has learned before by receiving the GPS signals to the speed calculation section 41 of the autonomic calculation section 12: What the learning section 11 has learned include the zero point offset OFx, OFy and OFz or $OF_{BX}$ and $OF_{BY}$ of the acceleration sensor 5 and the tilt angle $\phi'$, swing angle $\theta'$ and pan angle $\psi'$ representing the attachment angle of the acceleration sensor 5 with respect to the vehicle.

In line with the method described in the above chapter (1-7) or (1-10), the speed calculation section 41 of the autonomic calculation section 12 autonomically calculates (or estimates) the acceleration in the direction of the motion $\alpha x$ to calculate (or estimate) the vehicle's autonomic speed Vt, based on the following data: the altitude difference $\Delta H$ supplied from the altitude difference calculation section 22; the three or two axis acceleration sensor observation value AD or $AD_B$ supplied from the acceleration sensor 5; and the previous learning result (the zero point offset OFx, OFy and OFz or $OF_{BX}$ and $OF_{BY}$ of the acceleration sensor 5 and the tilt angle $\phi'$, swing angle $\theta'$ and pan angle $\psi'$ representing the attachment angle of the acceleration sensor 5 with respect to the vehicle) supplied from the attachment angle/offset learning section 33.

The car navigation apparatus 1 therefore can calculate the current position of the vehicle by integrating the vehicle's autonomic speed Vt. Accordingly, the car navigation apparatus 1 can display the vehicle's current position on a map displayed on the screen even when not receiving the GPS signals.

Figure 8:
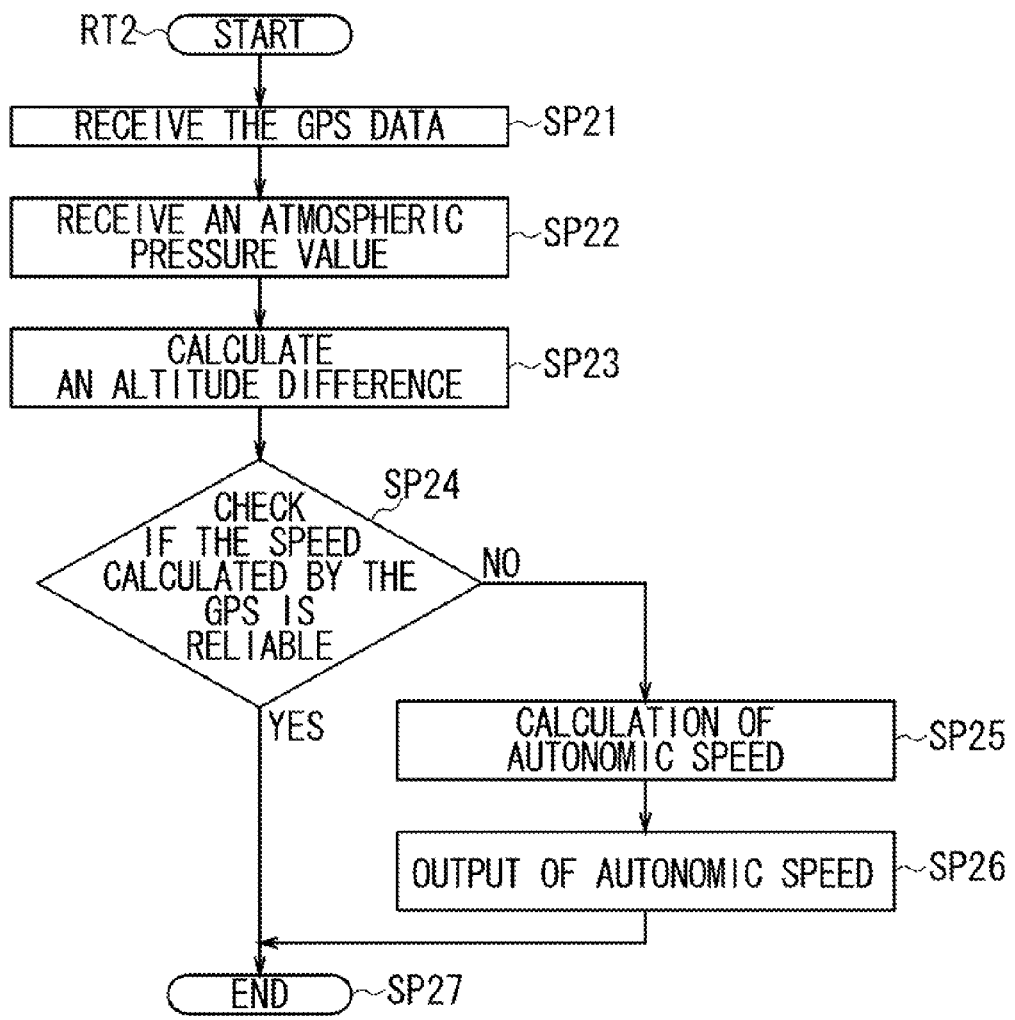
FIG. 8 is a flowchart illustrating a procedure of an autonomic speed calculation process.

FIG. 8 illustrates a procedure of the autonomic speed calculation process by the car navigation apparatus 1 operating in the GPS non-operating mode. The car navigation apparatus 1 starts the routine RT2 from start step and then proceeds to step SP21. At step SP21, in the car navigation apparatus 1, after calculating the vehicle's speed data V and the direction data D based on the GPS signals from the GPS satellites, the GPS processing section 3 supplies the speed data V and the direction data D to the learning section 11 as GPS data. The car navigation apparatus 1 subsequently proceeds to step SP22.

At step SP22, in the car navigation apparatus 1, the barometric sensor 4 supplies the atmospheric pressure value PR to the altitude difference calculation section 22 of the road inclination calculation section 10. The car navigation apparatus 1 subsequently proceeds to step SP23.

At step SP23, in the car navigation apparatus 1, the altitude difference calculation section 22 calculates the altitude difference $\Delta H$ based on the atmospheric pressure/altitude table TBL. The car navigation apparatus 1 subsequently proceeds to step SP24.

At step SP24, the car navigation apparatus 1 checks if the speed information V, obtained at step SP21, is reliable or not, based on a flag attached to the speed information V. If the car navigation apparatus 1 determines that it is reliable, then this means that the apparatus 1 is receiving the real GPS signals and there is no need to continue the autonomic speed calculation process. In this case, the car navigation apparatus 1 proceeds to step SP27 to end the process.

Whereas if the car navigation apparatus 1 determines that it is unreliable, then this means that the apparatus 1 is not receiving the GPS signals. In this case, the car navigation apparatus 1 proceeds to step SP25.

At step SP25, since it is not receiving the GPS signals, in line with the method described in the above chapter (1-7) or (1-10), the car navigation apparatus 1 estimates the acceleration in the direction of the motion $\alpha x$ to calculate the vehicle's autonomic speed Vt by integration calculation, based on what it has learned before by receiving the GPS signals (i.e. the zero point offset OFx, OFy and OFz or $OF_{BX}$ and $OF_{BY}$ of the acceleration sensor 5 and the tilt angle $\phi'$, swing angle $\theta'$ and pan angle $\psi'$ representing the attachment angle of the acceleration sensor 5 with respect to the vehicle). The car navigation apparatus 1 subsequently proceeds to step SP26.

At step SP26, the car navigation apparatus 1 outputs the calculated autonomic speed Vt. Thus, the car navigation apparatus 1 can display the vehicle's current position on a map displayed on the screen even when not receiving the GPS signals. The car navigation apparatus 1 subsequently proceeds to step SP27 to end the process.

(3) Operation and Effect

When receiving the GPS signals, the car navigation apparatus 1 is designed to learn the following data as a preparation for disconnection with the GPS satellites: the tilt angle $\phi'$, swing angle $\theta'$ and pan angle $\psi'$ representing the attachment angle of the acceleration sensor 5, installed in the monitor-integrated-type body, with respect to the vehicle; and the zero point offset OFx, OFy and OFz or $OF_{BX}$ and $OF_{BY}$ of the acceleration sensor 5.

The car navigation apparatus 1 continuously calculates those data (the tilt angle $\phi'$, swing angle $\theta'$ and pan angle $\psi'$ representing the attachment angle of the acceleration sensor 5 with respect to the vehicle and the zero point offset OFx, OFy and OFz or $OF_{BX}$ and $OF_{BY}$ of the acceleration sensor 5) several times for several seconds or several minutes, and then smoothes and averages them. The car navigation apparatus 1 memorizes the smoothed or averaged data as the learning result. That helps producing more accurate estimates of the zero point offset OF and attachment angle of the acceleration sensor 5.

Moreover, the three or two axis acceleration sensor observation value AD or $Ad_B$, supplied from the acceleration sensor 5, can be calculated precisely: As indicated by the above equations (24) to (29), (33) and the like, since the gravity acceleration g in all the direction of the x", y" and z" axes of the sensor coordinate system are taken into consideration, the error of the gravity acceleration g may not affect the tilt angle $\phi'$, swing angle $\theta'$ and pan angle $\psi'$ representing the attachment angle of the acceleration sensor 5 with respect to the vehicle and the zero point offset OFx, OFy and OFz or $OF_{BX}$ and $OF_{BY}$ of the acceleration sensor 5.

Even when not receiving the GPS signals, the car navigation apparatus 1 can precisely estimate the acceleration in the direction of the motion $\alpha x$ based on the following data: the data the apparatus 1 has previously learned (the tilt angle $\phi'$, swing angle $\theta'$ and pan angle $\psi'$ representing the attachment angle of the acceleration sensor 5 with respect to the vehicle and the zero point offset OFx, OFy and OFz or $OF_{BX}$ and $OF_{BY}$ of the acceleration sensor 5); the three or two axis acceleration sensor observation value AD or $AD_B$ detected by the acceleration sensor 5; and the altitude difference $\Delta H$. Accordingly, the car navigation apparatus 1 can precisely calculate, based on the calculated acceleration $\alpha x$, the autonomic speed Vt to display the current position on the screen.

In that manner, the car navigation apparatus 1 according to an embodiment of the present invention can automatically calculate the zero point offset OF and the attachment angle of the acceleration sensor 5 (installed in the monitor-integrated-type body) with respect to the vehicle even when it is placed inside the vehicle. This offers easy-to-use portable navigation system, compared to the typical car navigation system that uses the vehicle's speed pulse. Even when it is brought into a different vehicle the car navigation apparatus 1 according to an embodiment of the present invention can automatically calculate the zero point offset OF and the attachment angle of the acceleration sensor 5 with respect to the vehicle.

That is, the car navigation apparatus 1 according to an embodiment of the present invention can automatically calculate the zero point offset OF and the attachment angle of the acceleration sensor 5 with respect to the vehicle when it is brought into the vehicle. Even when it is not receiving the GPS signals due to the vehicle running inside a tunnel or the like, the car navigation apparatus 1 can precisely calculate the vehicle's autonomic speed Vt and current position based on the observation values detected by the acceleration sensor 5. In this manner, the car navigation apparatus 1 continuously offers navigation service.

According to the above configuration, the car navigation apparatus 1 previously learns, while receiving the GPS signals, the zero point offset OF and the attachment angle of the acceleration sensor 5. When not receiving the GPS signals, the car navigation apparatus 1 calculates the acceleration in the direction of the vehicle's motion αx based on what it has learned (the zero point offset OF and the attachment angle of the acceleration sensor 5), the three or two axis acceleration sensor observation value AD or $AD_B$ supplied from the acceleration sensor 5 and the like. The car navigation apparatus 1 therefore can calculate the vehicle's autonomic speed Vt and current position based on the calculated acceleration αx. That enables the car navigation apparatus 1 to continuously display the current position on the map being displayed on the screen.

(4) Other Embodiment

In the above-noted embodiment, the three or two axis acceleration sensor 5 is installed in the monitor-integrated-type body. However, the present invention is not limited to this. Alternatively, the three or two axis acceleration sensor 5 may be installed in other sections, such as a body section with no monitor or a separated monitor.

Moreover, in the above-noted embodiment, the car navigation apparatus 1 is used in a vehicle (equivalent to a mobile object). However, the present invention is not limited to this. The navigation apparatus 1 may be also used in boats, ships, trains and other mobile objects.

Furthermore, in the above-noted embodiments, the Newton-Raphson method is used to calculate the zero point offset OFx, OFy and OFz or $OF_{BX}$ and $OF_{BY}$ of the acceleration sensor 5 and the tilt angle φ', swing angle θ' and pan angle ψ' representing the attachment angle of the acceleration sensor 5 with respect to the vehicle. However, the present invention is not limited to this. Other calculation methods may be used to calculate the zero point offset OFx, OFy and OFz or $OF_{BX}$ and $OF_{BY}$ of the acceleration sensor 5 and the tilt angle φ', swing angle θ' and pan angle ψ' representing the attachment angle of the acceleration sensor 5 with respect to the vehicle.

Furthermore, in the above-noted embodiments, the GPS processing section 3 calculates the vehicle's speed data V and direction data D based on the GPS signals received via the GPS antenna 2 from the GPS satellites. However, the present invention is not limited to this. The GPS processing section 3 may calculate the vehicle's speed data V and direction data D by using other GPS satellite systems such as quasi-zenith satellite systems, Global Navigation Satellite System (GLONASS) or GALILEO.

Furthermore, in the above-noted embodiment, the car navigation apparatus 1 calculates the attachment angle of the acceleration sensor 5 and the zero point offset OF at once. However, the present invention is not limited to this. The car navigation apparatus 1 may first calculate the attachment angle of the acceleration sensor 5 and then the zero point offset OF.

Furthermore, in the above-noted embodiment, the car navigation apparatus 1 executes the navigation information calculation program, read out from the ROM by the arithmetic processing unit 6, to perform the learning process (the routine RT1 in FIG. 6) and the autonomic speed calculation process (the routine RT2 in FIG. 8). However, the present invention is not limited to this. The navigation information calculation program may be supplied from a storage medium or via the Internet when the car navigation apparatus 1 performs the learning process (the routine RT1) and the autonomic speed calculation process (the routine RT2).

Furthermore, in the above-noted embodiment, as the software components, the navigation apparatus includes: the acceleration calculation section 31, equivalent to travel direction acceleration calculation means; the lateral acceleration calculation section 32, equivalent to lateral acceleration calculation means; the acceleration sensor 5, equivalent to an acceleration sensor; the altitude difference calculation section 22, equivalent to altitude difference calculation means; the forward-backward inclination calculation section 23, equivalent to inclination calculation means; and the attachment angle/offset learning section 33, equivalent to attachment angle calculation means. However, the present invention is not limited to this. The navigation apparatus may be equipped with hardware components to realize the travel direction acceleration calculation means, the lateral acceleration calculation means, the acceleration sensor, the altitude difference calculation means, the inclination calculation means and the attachment angle calculation means.

The method according to an embodiment of the present invention can be applied to a Personal Digital Assistant (PDA) device with GPS system, a mobile phone, a personal computer and the like, instead of the portable navigation apparatus to be attached to the inside of the vehicle.

It should be understood by those skilled in the art that various modifications, combinations, sub-combinations and alterations may occur depending on design requirements and other factors insofar as they are within the scope of the appended claims of the equivalents thereof.

What is claimed is:

1. A navigation apparatus comprising:
   travel direction acceleration calculation means for calculating a mobile object's acceleration in the direction of the mobile object's motion, based on the mobile object's speed calculated from information received from a satellite;
   lateral acceleration calculation means for calculating lateral acceleration whose direction is perpendicular to the mobile object's motion, based on the mobile object's speed and direction calculated from information received from the satellite;
   an acceleration sensor for observing motion acceleration of the mobile object and gravity acceleration;
   altitude difference calculation means for calculating an altitude difference of road based on an atmospheric pressure value supplied from a barometric sensor;
   inclination calculation means for calculating an inclination angle of the road in the direction of the motion, based on the altitude difference and a travel distance corresponding to the mobile object's speed; and
   attachment angle calculation means for calculating an attachment angle of the acceleration sensor with respect to the mobile object by using a multidimensional function formula including the acceleration in the direction of motion, the lateral acceleration, values observed by the acceleration sensor and the inclination angle, the observed values including the motion acceleration and the gravity acceleration.

2. A navigation information calculation method comprising:
- a travel direction acceleration calculation step of calculating a mobile object's acceleration in the direction of the mobile object's motion, based on the mobile object's speed calculated from information received from a satellite;
- a lateral acceleration calculation step of calculating lateral acceleration whose direction is perpendicular to the mobile object's motion, based on the mobile object's speed and direction calculated from information received from the satellite;
- an observation step of observing motion acceleration of the mobile object and gravity acceleration by using an acceleration sensor;
- an altitude difference calculation step of calculating an altitude difference of road based on an atmospheric pressure value supplied from a barometric sensor;
- an inclination calculation step of calculating an inclination angle of the road in the direction of the motion, based on the altitude difference calculated by the altitude difference calculation step and a travel distance corresponding to the mobile object's speed; and
- an attachment angle calculation step of calculating an attachment angle of the acceleration sensor with respect to the mobile object by using a multidimensional function formula including the acceleration in the direction of the motion, the lateral acceleration, values observed by the acceleration sensor and the inclination angle, the observed values including the motion acceleration and the gravity acceleration.

3. The navigation information calculation method according to claim 2, wherein
the attachment angle calculation step calculates a zero point offset of the acceleration sensor as well as the attachment angle.

4. The navigation information calculation method according to claim 2, wherein
the attachment angle calculation step repeatedly calculates the attachment angle over time and the smoothes or averages the calculated angles in order to obtain a precise learning result even when the attachment angle changes over time.

5. The navigation information calculation method according to claim 2, wherein
the attachment angle calculation step repeatedly calculates a zero point offset of the acceleration sensor over time and then smoothes or averages the calculated offsets in order to obtain a precise learning result even when the zero point offset changes over time.

6. The navigation information calculation method according to claim 2, further comprising
a travel direction acceleration estimation step of estimating, while not receiving the information from the satellite, the mobile object's acceleration in the direction of the mobile object's motion, based on the attachment angle calculated by the attachment angle calculation step, the altitude difference calculated by the altitude difference calculation step and the values observed by the acceleration sensor, the observed values including the motion acceleration and the gravity acceleration.

7. The navigation information calculation method according to claim 5, further comprising
a travel direction acceleration estimation step of estimating, while not receiving the information from the satellite, the mobile object's acceleration in the direction of the mobile object's motion, based on the learning result of the attachment angle obtained by the attachment angle calculation step, the altitude difference calculated by the altitude difference calculation step and the values observed by the acceleration sensor, the observed values including the motion acceleration and the gravity acceleration.

8. A navigation apparatus comprising:
- a travel direction acceleration calculation section that calculates a mobile object's acceleration in the direction of the mobile object's motion, based on the mobile object's speed calculated from information received from a satellite;
- a lateral acceleration calculation section that calculates lateral acceleration whose direction is perpendicular to the mobile object's motion, based on the mobile object's speed and direction calculated from information received from the satellite;
- an acceleration sensor that observes motion acceleration of the mobile object and gravity acceleration;
- an altitude difference calculation section that calculates an altitude difference of road based on an atmospheric pressure value supplied from a barometric sensor;
- an inclination calculation section that calculates an inclination angle of the road in the direction of the motion, based on the altitude difference and a travel distance corresponding to the mobile object's speed; and
- an attachment angle calculation section that calculates an attachment angle of the acceleration sensor with respect to the mobile object by using a multidimensional function formula including the acceleration in the direction of the motion, the lateral acceleration, values observed by the acceleration sensor and the inclination angle, the observed values including the motion acceleration and the gravity acceleration.

9. The navigation apparatus according to claim 8, wherein
the attachment angle calculation section calculates a zero point offset of the acceleration sensor as well as the attachment angle.

10. The navigation apparatus according to claim 8, wherein
the attachment angle calculation section repeatedly calculates the attachment angle over time and then smoothes or averages the calculated angles in order to obtain a precise learning result even when the attachment angle changes over time.

11. The navigation apparatus according to claim 8, wherein
the attachment angle calculation section repeatedly calculates a zero point offset of the acceleration sensor over time and then smoothes or averages the calculated offsets in order to obtain a precise learning result even when the zero point offset changes over time.

12. The navigation apparatus according to claim 8, further comprising:
a travel direction acceleration estimation section for estimating, while not receiving the information from the satellite, the mobile object's acceleration in the direction of the mobile object's motion, based on the attachment angle calculated by the attachment angle calculation section, the altitude difference calculated by the altitude difference calculation section and the values observed by the acceleration sensor, the observed values including the motion acceleration and the gravity acceleration.

13. The navigation apparatus according to claim 11, further comprising:

a travel direction acceleration estimation section for estimating, while not receiving the information from the satellite, the mobile object's acceleration in the direction of the mobile object's motion, based on the learning result of the attachment angle obtained by the attachment angle calculation section, the altitude difference calculated by the altitude difference calculation section and the values observed by the acceleration sensor, the observed values including the motion acceleration and the gravity acceleration.

* * * * *